US012460180B2

(12) United States Patent
Bhandari et al.

(10) Patent No.: US 12,460,180 B2
(45) Date of Patent: Nov. 4, 2025

(54) METHODS FOR ISOLATING AND EXPANDING CELLS

(71) Applicant: GammaDelta Therapeutics Limited, London (GB)

(72) Inventors: Shristi Bhandari, London (GB); Samuel Florence, London (GB); Andrew Hutton, London (GB); Louisa Mathias, London (GB); Oliver Nussbaumer, London (GB); Kalle Soderstrom, London (GB); Mark Uden, London (GB)

(73) Assignee: GammaDelta Therapeutics Limited, London (GB)

( * ) Notice: Subject to any disclaimer, the term of this patent is extended or adjusted under 35 U.S.C. 154(b) by 989 days.

(21) Appl. No.: 17/292,411

(22) PCT Filed: Nov. 8, 2019

(86) PCT No.: PCT/GB2019/053166
§ 371 (c)(1),
(2) Date: May 7, 2021

(87) PCT Pub. No.: WO2020/095059
PCT Pub. Date: May 14, 2020

(65) Prior Publication Data
US 2022/0010276 A1  Jan. 13, 2022

(30) Foreign Application Priority Data
Nov. 8, 2018  (GB) .................................... 1818243

(51) Int. Cl.
*C12N 5/0783* (2010.01)
*A61K 35/17* (2025.01)
*C12M 1/04* (2006.01)

(52) U.S. Cl.
CPC ............ *C12N 5/0638* (2013.01); *A61K 35/17* (2013.01); *C12N 5/0646* (2013.01); *C12N 2500/90* (2013.01); *C12N 2501/2302* (2013.01); *C12N 2501/2315* (2013.01)

(58) Field of Classification Search
CPC .............. C12N 5/0638; C12N 2500/90; C12N 2501/2302; C12N 2501/2315
See application file for complete search history.

(56) References Cited

U.S. PATENT DOCUMENTS

| | | | |
|---|---|---|---|
| 6,313,272 B1 | 11/2001 | Greve et al. | |
| 7,078,034 B2 | 7/2006 | Lamb, Jr. | |
| 9,255,243 B2 | 2/2016 | Wilson et al. | |
| 2005/0106717 A1 | 5/2005 | Wilson et al. | |
| 2008/0312808 A1* | 12/2008 | Mino | F02D 41/0045 123/519 |
| 2012/0282250 A1 | 11/2012 | Sivakumar et al. | |
| 2014/0046026 A1 | 2/2014 | Garcia et al. | |
| 2018/0312808 A1 | 11/2018 | Hayday et al. | |

FOREIGN PATENT DOCUMENTS

| | | |
|---|---|---|
| WO | WO-2005/035728 A2 | 4/2005 |
| WO | WO-2007/046006 A2 | 4/2007 |
| WO | WO-2012/156958 A2 | 11/2012 |
| WO | WO-2015/061694 A2 | 4/2015 |
| WO | WO-2015/189356 A1 | 12/2015 |
| WO | WO-2016/081518 A2 | 5/2016 |
| WO | WO-2016/198480 A1 | 12/2016 |
| WO | WO-2017/072367 A1 | 5/2017 |
| WO | WO-2018/094167 A1 | 5/2018 |
| WO | WO-2018129332 A1 | 7/2018 |
| WO | WO-2018/202808 A2 | 11/2018 |
| WO | WO-2018/229163 A1 | 12/2018 |
| WO | WO-2020/095058 A1 | 5/2020 |
| WO | WO-2020/095059 A1 | 5/2020 |

OTHER PUBLICATIONS

Sanz et al., (2023) Deep characterization of human γδ T cells subsets defines shared and lineage-specific traits. Frontiers in Immunology, 14, https://doi.org/10.3389/fimmu.2023.1148988 (Year: 2023).*
Clark et al., (2006) A novel method for the isolation of skin resident T cells from normal and diseased human skin. Journal of Investigative Dermatology, 126(5) pp. 1059-1070 (Year: 2006).*
Petrov et al., "Compound CAR T-cells as a double-pronged approach for treating acute myeloid leukemia," Leukemia. 32:1317-1326 (2018).
Gill et al., "Preclinical targeting of human acute myeloid leukemia and myeloablation using chimeric antigen receptor-modified T cells," Blood. 123(15):2343-2354 (2014).
Mardiros et al., "T cells expressing CD123-specific chimeric antigen receptors exhibit specific cytolytic effector functions and antitumor effects against human acute myeloid leukemia," Blood. 122(18):3138-3148 (2013).
Nóbrega-Pereira et al., "VEGFR2-Mediated Reprogramming of Mitochondrial Metabolism Regulates the Sensitivity of Acute Myeloid Leukemia to Chemotherapy," Cancer Res. 78(3):731-741 (2018).
Di Lorenzo et al., "High-throughput analysis of the human thymic Vδ1+T cell receptor repertoire," Scientific Data. 6(115) (2019) (8 pages).
Verstichel et al., "The Checkpoint for Agonist Selection precedes Conventional Selection in Human Thymus," available in PMC Feb. 24, 2018, published in final edited form as: Sci Immunology. 2(8) (2017) (28 pages).
Almeida et al., "Delta One T Cells for Immunotherapy of Chronic Lymptocytic Leukemia: Clinical-Grade Expansion/Differentiation and Preclinical Proof of Concept," Clin Cancer Res. 22(23): 5795-5804 (2016).

(Continued)

*Primary Examiner* — Kara D Johnson
(74) *Attorney, Agent, or Firm* — Sterne, Kessler, Goldstein & Fox P.L.L.C.

(57) ABSTRACT

The present invention relates to a method for the isolation of lymphocytes (in particular γδ T cells) from a non-haematopoietic tissue sample comprising the steps of culturing a non-haematopoietic tissue sample which is an intact biopsy obtained from a non-haematopoietic tissue in the presence of Interleukin-2 (IL-2) and Interleukin-15 (IL-15); and collecting a population of lymphocytes cultured from the non-haematopoietic tissue sample. Methods of subsequent expansion are provided, as well as populations of isolated cells obtained by the method and uses thereof.

16 Claims, 5 Drawing Sheets

(56) References Cited

OTHER PUBLICATIONS

Tefferi et al., "Classification and diagnosis of myeloproliferative neoplasms: The 2008 World Health Organization criteria and point-of-care diagnostic algorithms," Leukemia. 22:14-22 (2008).

Murati et al., "Myeloid malignancies: mutations, models and management," BMC Cancer. 12:304 (2012) (15 pages).

Gentles et al., "The prognostic landscape of genes and infiltrating immune cells across human cancers," available in PMC May, 2, 2016, published in final edited form as: Nat Med. 21(8): 938-945 (2015) (28 pages).

Deniger et al., "Activating and propagating polyclonal gamma delta T cells with broad specificity for malignancies," available in PMC May 15, 2015, published in final edited form as: Clin Cancer Res. 20(22): 5708-5719 (2014) (21 pages).

Di Lorenzo et al., "Broad Cytotoxic Targeting of Acute Myeloid Leukemia by Polyclonal Delta One T Cells," epublished version Mar. 2019, published in final edited form as: Cancer Immunol Res. 7(4):552-558 (2019) (8 pages).

Supplementary material for: Di Lorenzo et al., "Broad Cytotoxic Targeting of Acute Myeloid Leukemia by Polyclonal Delta One T Cells," Cancer ImmunolRes. 7(4):552-8 (2019) (9 pages).

Silva-Santos et al., "GammaDelta T cells: pleiotropic immune effectors with therapeutic potential in cancer," version published online Jun. 17, 2019, published in final edited form as: Nat Rev Cancer. 19(7): 392-404 (2019) (13 pages).

Yazdanifar et al., "Gamma Delta T Cells: The Ideal Tool for Cancer Immunotherapy," Cells. 9(5):1305 (2020) (26 pages).

International Search Report and Written Opinion of the International Searching Authority for International Application No. PCT/GB2019/053164, mailed on Jan. 14, 2021 (10 pages).

International Search Report and Written Opinion of the International Searching Authority for International Application No. PCT/GB2019/053166, mailed on Feb. 28, 2020 (11 pages).

International Preliminary Report on Patentability for International Application No. PCT/GB2019/053164, issued May 11, 2021 (7 pages).

International Preliminary Report on Patentability for International Application No. PCT/GB2019/053166, issued May 11, 2021 (8 pages).

Cheuk et al., "CD49a Expression Defines Tissue-Resident $CD8^+$ T Cells Poised for Cytotoxic Function in Human Skin," Immunity. 46:287-300 (2017) (15 pages).

Clark et al., "A Novel Method for the Isolation of Skin Resident T Cells from Normal and Diseased Human Skin," J Invest Dermatol. 126:1059-1070 (2006).

Woolf et al., "Potential for innate-like responsiveness of resident T cells in human skin: a new perspective on tissue immune-surveillance," Lancet. 387:108 Abstract 77 (2016).

Di Marco Barros et al., "Epithelia Use Butyrophilin-like Molecules to Shape Organ-Specific Gamma-delta T Cell Compartments," Cell. 167(1):203-18.e17 (2016) (38 pages).

Choudhary et al., "Selective lysis of autologous tumor cells by recurrent gamma delta tumor-infiltrating lymphocytes from renal carcinoma," J Immunol. 154(8):3932-40 (1995).

Chu et al., "Differential effects of IL-2 and IL-15 on the death and survival of activated TCR gamma delta+ intestinal intraepithelial lymphocytes," J Immunol. 162(4):1896-903 (1999) (9 pages).

Chennupati et al., "Intra- and intercompartmental movement of gammadelta T cells: intestinal intraepithelial and peripheral gammadelta T cells represent exclusive nonoverlapping populations with distinct migration characteristics," J Immunol. 185(9):5160-8 (2010) (11 pages).

Deniger et al., "Clinical Applications of Gamma Delta T Cells with Multivalent Immunity," Front Immunol. 5:636 (2014) (10 pages).

Garcia et al., "IL-15 Enhances the Response of Human Gamma Delta T Cells to Nonpetide Microbial Antigens," J Immunol. 160(9):4322-4329 (1998) (9 pages).

Kim et al., "Comparative Analysis of Human Epidermal and Peripheral Blood Gamma Delta T Cell Cytokine Profiles," Ann Dermatol. 26(3):308-13 (2014).

Nanno et al., "Gamma/delta T cell antigen receptors expressed on tumor-infiltrating lymphocytes from patients with solid tumors," Eur J Immunol. 22(3):679-87 (1992).

Ribot et al., "Human GammaDelta Thymocytes are Functionally Immature and Differentiate into Cytotoxic Type 1 Effector T Cells upon IL-2/IL-15 Signaling," J Immunol. 192(5):2237-43 (includes supplemental content) (2014) (11 pages).

Silva-Santos et al., "GammaDelta T Cells in Cancer," Nat Rev Immunol. 15(11):683-91 (2015).

Tan et al., "Expansion of Gamma Delta T Cells—A Short Review on Bisphosphonate and K562-Based Methods," Journal of Immunological Sciences. 2(3):6-12 (2018).

Van Acker et al., "Interleukin-15 enhances the proliferation, stimulatory phenotype, and antitumor effector functions of human gamma delta T cells," J Hematol Oncol. 9(1):101 (2016) (13 pages).

Woolf et al., "Cutaneous V(delta) 1+ cells provide evidence for human innate-like T-cells," Immunol. 143(Suppl. 2):51 (2014) (Abstract Only).

Woolf et al., "V(delta) 1+ T cells in human skin provide evidence for innate-like T cells with implications for tissue lymphoid stress surveillance," Brit J Dermatol. 172(Suppl 5): e48 (2015) (Abstract Only).

Woolf et al., "464 Healthy Human skin harbours a resident T cell subset with rapid, innate-like responsiveness: a new perspective on tissue immune-surveillance," retrieved from <https://www.sciencedirect.com/science/article/pii/S0022202X16305541> on Jan. 14, 2020, J Invest Dermatol. 136(5 Suppl 1):S82 (2016) (Abstract Only).

Xiao et al., "Large-scale expansion of Vgamma9Vdelta2 T cells with Engineered K562 feeder cells in G-Rex vessels and Their Use as CAR-modified Effector Cells," author manuscript published 2018, published in final edited form as: Cytotherapy. 20(3):420-435 (2018) (28 pages).

* cited by examiner

METHODS FOR ISOLATING AND EXPANDING CELLS

FIELD OF THE INVENTION

The invention relates to methods for the isolation and/or expansion of non-haematopoietic tissue-resident lymphocytes, particularly γδ T cells. Such γδ T cells include non-Vδ2 cells, e.g. Vδ1, Vδ3 and Vδ5 cells and such non-haematopoietic tissues include skin and gut. It will be appreciated that such isolated and/or expanded non-haematopoietic tissue-resident lymphocytes find great utility in adoptive T cell therapies, chimeric receptor therapies and the like. The present invention also relates to the cells produced by the methods described herein.

BACKGROUND OF THE INVENTION

The growing interest in T cell immunotherapy for cancer has focused on the evident capacity of subsets of CD8+ and CD4+ αβ T cells to recognize cancer cells and to mediate host-protective functional potentials, particularly when de-repressed by clinically mediated antagonism of inhibitory pathways exerted by PD-1, CTLA-4, and other receptors. However, αβ T cells are MHC-restricted, which can lead to graft versus host disease.

Gamma delta T cells (γδ T cells) represent a subset of T cells that express on their surface a distinct, defining γδ T-cell receptor (TCR). This TCR is made up of one gamma (γ) and one delta (δ) chain. Human γδ TCR chains are selected from three main δ chains, Vδ1, Vδ2 and Vδ3 and six γ chains. Human γδ T cells can be broadly classified based on their TCR chains, as certain γ and δ types are found on cells more prevalently, though not exclusively, in one or more tissue types. For example, most blood-resident γδ T cells express a Vδ2 TCR, for example Vγ9Vδ2, whereas this is less common among tissue-resident γδ T cells, which more frequently use Vδ1 in skin and Vγ4 in the gut.

The majority of methods for isolating lymphocytes has depended on isolating those cell types from the blood, Non-haematopoietic tissue resident lymphocytes, such as αβ T cells, γδ T cells and NK cells, may have properties especially suitable for certain applications, such as for targeting non-haematopoietic tumors and other targets. However, isolating such tissue resident lymphocytes in clinically relevant quantities has remained a challenge, especially as clinical doses ranging from $10^8$ cells upwards are required for many indications, Importantly, significant cell loss during production means even more starting cells must be generated.

Because non-haematopoietic tissue-resident lymphocytes, particularly αβ T cells, γδ T cells and NK cells, are not easily obtainable in high numbers, they have not been well characterized or studied for therapeutic applications. Therefore, there is a need in the field for methods to isolate and expand non-haematopoietic tissue-resident lymphocytes, in particular γδ T cells, to quantities sufficient to study and potentially adapt as therapies, e.g., as adoptive T cell therapies.

Clark et al. (2006) J. Invest. Dermatol. 126(5): 1059-70 describes a method of isolating skin resident T cells from normal and diseased skin. However, the methods described therein are unsuitable for clinical use due to the presence of animal products but especially due to the relatively low yield of cells isolated, namely less than $10^6$ cells per $cm^2$ tissue. The method described in Clark et al. uses minced samples which results in deliberate disruption to the structural integrity of the tissue sample. WO2017072367 and WO2018/202808 relate to methods of expanding non-haematopoietic tissue-resident γδ T cells in vitro by culturing lymphocytes obtained from non-haematopoietic tissue in the presence of at least Interleukin-2 (IL-2) and/or Interleukin-15 (IL-15). WO2015189356 describes a composition for expanding lymphocytes obtained from a sample obtained by aphaeresis comprising at least two types of cytokines selected from IL-2, IL-15 and IL-21. Therefore, there still remains a need for a method of isolating tissue-resident non-haematopoietic lymphocytes, such as from skin, that yields a greater amount of cells that are suitable for clinical use.

SUMMARY OF THE INVENTION

According to a first aspect of the invention, there is provided a method for the isolation of lymphocytes from a non-haematopoietic tissue sample comprising the steps of:
 (i) culturing a non-haematopoietic tissue sample which is an intact biopsy with a minimum cross-section of at least 2 mm obtained from a non-haematopoietic tissue in the presence of Interleukin-2 (IL-2) and Interleukin-15 (IL-15); and
 (ii) collecting a population of lymphocytes cultured from the non-haematopoietic tissue sample.

According to a further aspect of the invention, there is provided a method for the isolation of γδ T cells from a non-haematopoietic tissue sample comprising the steps of:
 (i) culturing a non-haematopoietic tissue sample which is an intact biopsy with a minimum cross-section of at least 2 mm obtained from a non-haematopoietic tissue in the presence of IL-2 and IL-15; and
 (ii) collecting a population of γδ T cells cultured from the non-haematopoietic tissue sample.

According to a further aspect of the invention, there is provided a method for the isolation of lymphocytes from a non-haematopoietic tissue sample comprising the steps of:
 (i) culturing a non-haematopoietic tissue sample which is an intact biopsy with a minimum cross-sectional area of at least 2 $mm^2$ obtained from a non-haematopoietic tissue in the presence of IL-2 and IL-15; and
 (ii) collecting a population of lymphocytes cultured from the non-haematopoietic tissue sample.

According to a further aspect of the invention, there is provided a method for the isolation of γδ T cells from a non-haematopoietic tissue sample comprising the steps of:
 (i) culturing a non-haematopoietic tissue sample which is an intact biopsy with a minimum cross-sectional area of at least 2 $mm^2$ obtained from a non-haematopoietic tissue in the presence of IL-2 and IL-15; and
 (ii) collecting a population of γδ T cells cultured from the non-haematopoietic tissue sample.

According to a further aspect of the invention, there is provided a method for the isolation of lymphocytes from a non-haematopoietic tissue sample comprising the steps of:
 (i) culturing a non-haematopoietic tissue sample which is an intact biopsy with a volume of at least 2 $mm^3$ obtained from a non-haematopoietic tissue in the presence of IL-2 and IL-15; and
 (ii) collecting a population of lymphocytes cultured from the non-haematopoietic tissue sample.

According to a further aspect of the invention, there is provided a method for the isolation of γδ T cells from a non-haematopoietic tissue sample comprising the steps of:
 (i) culturing a non-haematopoietic tissue sample which is an intact biopsy with a volume of at least 2 $mm^3$ obtained from a non-haematopoietic tissue in the presence of IL-2 and IL-15; and
(ii) collecting a population of γδ T cells cultured from the non-haematopoietic tissue sample.

According to a further aspect of the invention, there is provided a method for the isolation of lymphocytes from a non-haematopoietic tissue sample comprising the steps of:
(i) placing a non-haematopoietic tissue sample in a vessel comprising a gas permeable material;
(ii) culturing the non-haematopoietic tissue sample in the presence of IL-2 and IL-15; and
(iii) collecting a population of lymphocytes cultured from the non-haematopoietic tissue sample.

According to a further aspect of the invention, there is provided a method for the isolation of γδ T cells from a non-haematopoietic tissue sample comprising the steps of:
(i) placing a non-haematopoietic tissue sample in a vessel comprising a gas permeable material;
(ii) culturing the non-haematopoietic tissue sample in the presence of IL-2 and IL-15; and
(iii) collecting a population of γδ T cells cultured from the non-haematopoietic tissue sample.

According to a further aspect of the invention, there is provided a method for the isolation and expansion of lymphocytes from a non-haematopoietic tissue sample comprising the steps of:
(i) isolating a population of lymphocytes from the non-haematopoietic tissue sample according to the method defined herein; and
(ii) further culturing said population of lymphocytes for at least 5 days to produce an expanded population of lymphocytes.

According to a further aspect of the invention, there is provided a method for the isolation and expansion of γδ T cells from a non-haematopoietic tissue sample comprising the steps of:
(i) isolating a population of γδ T cells from the non-haematopoietic tissue sample according to the method according to defined herein; and
(ii) further culturing said population of γδ T cells for at least 5 days to produce an expanded population of γδ T cells.

DETAILED DESCRIPTION OF THE INVENTION

Figure 1:
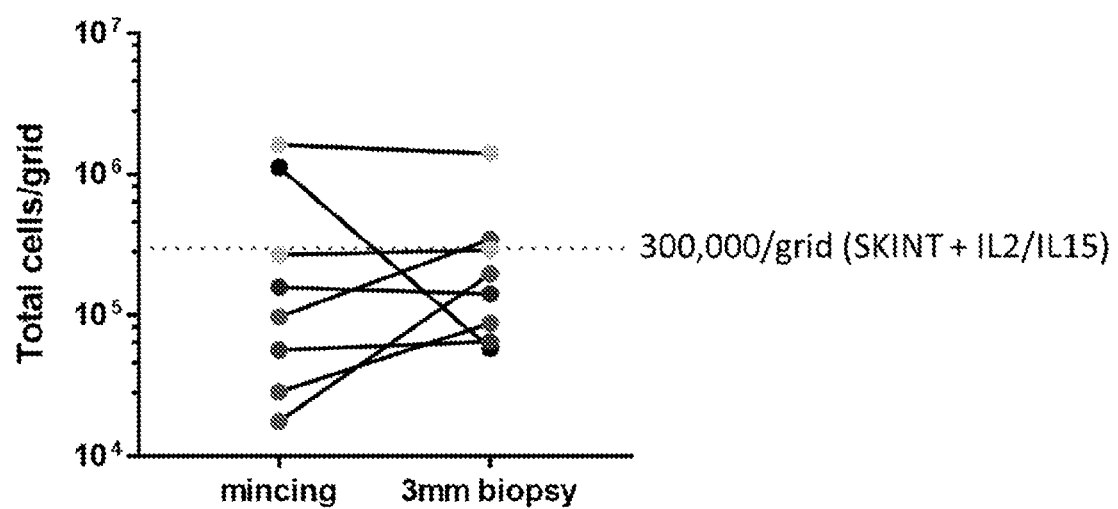
FIG. 1: Initial testing comparing total cell yield from 3 mm punch biopsies and standard skin mincing methods.

According to a first aspect of the invention, there is provided method for the isolation of lymphocytes from a non-haematopoietic tissue sample comprising the steps of:
(i) culturing a non-haematopoietic tissue sample which is an intact biopsy with a minimum cross-section of at least 2 mm obtained from a non-haematopoietic tissue in the presence of Interleukin-2 (IL-2) and Interleukin-15 (IL-15); and
(ii) collecting a population of lymphocytes cultured from the non-haematopoietic tissue sample.

According to a further aspect of the invention, there is provided method for the isolation of γδ T cells from a non-haematopoietic tissue sample comprising the steps of:
(i) culturing a non-haematopoietic tissue sample which is an intact biopsy with a minimum cross-section of at least 2 mm obtained from a non-haematopoietic tissue in the presence of IL-2 and IL-15; and
(ii) collecting a population of γδ T cells cultured from the non-haematopoietic tissue sample.

References herein to "isolation" or "isolating" of cells, in particular of lymphocytes and/or γδ T cells, refer to methods or processes wherein cells are removed, separated, purified, enriched or otherwise taken out from a tissue or a pool of cells. It will be appreciated that such references include the terms "separated", "removed", "purified", "enriched" and the like. Isolation of lymphocytes and/or γδ T cells includes the isolation or separation of cells from an intact non-haematopoietic tissue sample or from the stromal cells of the non-haematopoietic tissue (e.g. fibroblasts or epithelial cells). Such isolation may alternatively or additionally comprise the isolation or separation of γδ T cells from other haematopoietic cells (e.g. αβ T cells or other lymphocytes). Isolation may be for a defined period of time, for example starting from the time the tissue explant or biopsy is placed in the isolation culture and ending when the cells are collected from culture, such as by centrifugation or other means for transferring the isolated cell population to expansion culture or used for other purposes, or the original tissue explant or biopsy is removed from the culture. The isolation step may be for at least about three days to about 45 days. In one embodiment, the isolation step is for at least about 10 days to at least 28 days. In a further embodiment, the isolation step is for at least 14 days to at least 21 days. The isolation step may therefore be for at least three days, four days, five days, six days, seven days, eight days, nine days, ten days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, about 35 days, about 40 days, or about 45 days. It can be appreciated that although isolate cell proliferation may not be substantial during this isolation step, it is not necessarily absent. Indeed for someone skilled in the art it is recognized that isolated cells may also start to divide to generate a plurality of such cells within the isolation vessel containing the tissue and/or scaffold.

Thus, references herein to "isolated lymphocytes", "isolated lymphocyte population", "isolated population of lymphocytes", "separated lymphocytes", "separated lymphocyte population", "separated population of lymphocytes", "isolated γδ T cells", "isolated γδ T cell population", "isolated population of γδ T cells", "separated γδ T cells", "separated γδ T cell population" or "separated population of γδ T cells" will be appreciated to refer to haematopoietic cells or a population of haematopoietic cells including γδ cells that have been isolated, separated, removed, purified or enriched from a non-haematopoietic tissue sample of origin such that the cells are out of substantial contact with non-haematopoietic cells or cells contained within the intact non-haematopoietic tissue. Likewise, references herein to an "isolated or separated population of Vδ1 T cells" refer to haematopoietic cells including Vδ1 T cells that have been isolated, separated, removed, purified or enriched from non-haematopoietic tissue sample of origin such that the cells are out of substantial contact with non-haematopoietic cells or cells contained within the intact non-haematopoietic tissue. Therefore, isolation or separation refers to the isolation, separation, removal, purification or enrichment of haematopoietic cells (e.g. γδ T cells or other lymphocytes) from non-haematopoietic cells (e.g. stromal cells, fibroblasts and/or epithelial cells).

Methods of isolation of lymphocytes and/or γδ T cells as defined herein may comprise disruption of the tissue (e.g. mincing) followed by the separation of lymphocytes and/or γδ T cells from other cell types. Preferably, methods of isolation of lymphocytes and/or γδ T cells as defined herein may comprise "crawl-out" of lymphocytes and/or γδ T cells and other cell types from an intact non-haematopoietic tissue sample or tissue matrix of the explant or biopsy, wherein the tissue resident lymphocytes physically separate from the tissue matrix without requiring the disruption of the tissue matrix. By maintaining the integrity of the tissue matrix, it has been surprisingly found that the tissue resident lymphocytes preferentially egress from the tissue matrix with little or no egress of inhibitory cell types such as fibroblasts, which are retained in the explant or biopsy which can then be easily removed at the end of isolation. Thus, in some embodiments, the use of an intact non-haematopoietic tissue sample or tissue matrix leads to a low number of fibroblasts being released from the tissue into the culture. Such "crawl-out" methods utilising intact non-haematopoietic tissue or tissue matrix have the advantage of reducing the need for excess processing of the non-haematopoietic tissue sample or tissue matrix, maintain the structural integrity of the non-haematopoietic tissue or tissue matrix and may provide the unexpected advantage of delivering higher isolated cell yields.

Thus, the methods of isolation of non-haematopoietic tissue derived lymphocytes as defined herein include methods for isolating non-haematopoietic tissue derived lymphocytes from an intact biopsy or explant of non-haematopoietic tissue. Such an intact biopsy or explant is one wherein the structural integrity of the biopsy or explant has not been deliberately disrupted within the perimeter of the excision removing the biopsy or explant from the tissue sample. Such an intact biopsy or explant will have the three dimensional structure largely maintained except for minor disruption caused by handling. This intact biopsy or explant therefore has not been mechanically disrupted, such as by mincing or chopping, nor chemically enzymatically disrupted, for example. However, disrupted tissue may be used in the isolation methods of the present invention. In one embodiment, the isolated lymphocyte is an αs T cell. In an alternative embodiment the isolated lymphocyte is a γδ T cell. In another embodiment, the isolated lymphocyte is an NK cell. It can be appreciated that more than one type of lymphocyte may be isolated from the same isolation step.

Methods of isolation of lymphocytes and/or γδ T cells utilising "crawl-out" methods as defined herein may include the culturing of the cells and/or non-haematopoietic tissue in the presence of cytokines and/or chemokines sufficient to induce the isolation or separation of γδ T cells and/or other lymphocytes as defined herein. Thus, in one embodiment of the present invention, isolation of lymphocytes and/or γδ T cells from non-haematopoietic tissue comprises culturing the non-haematopoietic tissue in the presence of IL-2 and IL-15.

As used herein, "IL-2" refers to native or recombinant IL-2 or a variant thereof that acts as an agonist for one or more IL-2 receptor (IL-2R) subunits (e.g. mutants, muteins, analogues, subunits, receptor complexes, fragments, isoforms, and peptidomimetics thereof). Such agents can support proliferation of an IL-2-dependent cell line, CTLL-2 (33; American Type Culture Collection (ATCC®) TIB 214). Mature human IL-2 occurs as a 133 amino acid sequence (less the signal peptide, consisting of an additional 20 N-terminal amino acids), as described in Fujita, et al. *Cell* 1986. 46.3:401-407. An IL-2 mutein is a polypeptide wherein specific substitutions to the Interleukin-2 protein have been made while retaining the ability to bind IL-2Rβ, such as those described in US 2014/0046026. The IL-2 muteins can be characterized by amino acid insertions, deletions, substitutions and modifications at one or more sites in or at the other residues of the native IL-2 polypeptide chain. In accordance with this disclosure any such insertions, deletions, substitutions and modifications result in an IL-2 mutein that retains the IL-2Rβ binding activity. Exemplary muteins can include substitutions of 1, 2, 3, 4, 5, 6, 7, 8, 9, 10 or more amino acids. Nucleic acid encoding human IL-2 can be obtained by conventional procedures such as polymerase chain reaction (PCR). The amino acid sequence of human IL-2 (Gene ID 3558) is found in Genbank under accession locator NP_000577.2 GI: 28178861. The murine (Mus musculus) IL-2 amino acid sequence (Gene ID 16183) is found in Genbank under accession locator NP_032392.1 GI: 7110653.

IL-2 can also refer to IL-2 derived from a variety of mammalian species, including, for example, human, simian, bovine, porcine, equine, and murine. Variants may comprise conservatively substituted sequences, meaning that a given amino acid residue is replaced by a residue having similar physiochemical characteristics. Examples of conservative substitutions include substitution of one aliphatic residue for another, such as lie, Val, Leu, or Ala for one another, or substitutions of one polar residue for another, such as between Lys and Arg; Glu and Asp; or Gln and Asn. Other such conservative substitutions, for example, substitutions of entire regions having similar hydrophobicity characteristics, are well known. Naturally occurring IL-2 variants are also encompassed by the invention. Examples of such variants are proteins that result from alternate mRNA splicing events or from proteolytic cleavage of the IL-2 protein, wherein the IL-2 binding property is retained. Alternate splicing of mRNA may yield a truncated but biologically active IL-2 protein. Variations attributable to proteolysis include, for example, differences in the N- or C-termini upon expression in different types of host cells, due to proteolytic removal of one or more terminal amino acids from the IL-2 protein (generally from 1-10 amino acids). In some embodiments, the terminus or interior of the protein can be modified to alter its physical properties, for example, with a chemical group such as polyethylene glycol (Yang, et al. *Cancer* 1995. 76: 687-694). In some embodiments, the terminus or interior of the protein can be modified with additional amino acids (Clark-Lewis, et al. *PNAS* 1993. 90:3574-3577).

As used herein, "IL-15" refers to native or recombinant IL-15 or a variant thereof that acts as an agonist for one or more IL-15 receptor (IL-15R) subunits (e.g. mutants, muteins, analogues, subunits, receptor complexes, fragments, isoforms, and peptidomimetics thereof). IL-15, like IL-2, is a known T-cell growth factor that can support proliferation of an IL-2-dependent cell line, CTLL-2. IL-15 was first reported by Grabstein, et al. (Grabstein, et al. *Science* 1994. 264.5161: 965-969) as a 114-amino acid mature protein. The term "IL-15," as used herein, means native or recombinant IL-15 and muteins, analogs, subunits thereof, or complexes thereof (e.g. receptor complexes, e.g. sushi peptides, as described in WO 2007/046006), and each of which can stimulate proliferation of CTLL-2 cells. In the CTLL-2 proliferation assays, supernatants of cells transfected with recombinantly expressed precursor and in-frame fusions of mature forms of IL-15 can induce CTLL-2 cell proliferation.

Human IL-15 can be obtained according to the procedures described by Grabstein, et al. (Grabstein, et al. *Science* 1994. 264.5161: 965-969) or by conventional procedures such as polymerase chain reaction (PCR). A deposit of human IL-15 cDNA was made with the ATCC® on Feb. 19, 1993 and assigned accession number 69245.

The amino acid sequence of human IL-15 (Gene ID 3600) is found in Genbank under accession locator NP000576.1 GI: 10835153 (isoform 1) and NP_751915.1 GI: 26787986 (isoform 2). The murine (Mus musculus) IL-15 amino acid sequence (Gene ID 16168) is found in Genbank under accession locator NP_001241676.1 GI: 363000984.

IL-15 can also refer to IL-15 derived from a variety of mammalian species, including, for example, human, simian, bovine, porcine, equine, and murine. An IL-15 "mutein" or "variant", as referred to herein, is a polypeptide substantially homologous to a sequence of a native mammalian IL-15 but that has an amino acid sequence different from a native mammalian IL-15 polypeptide because of an amino acid deletion, insertion or substitution. Variants may comprise conservatively substituted sequences, meaning that a given amino acid residue is replaced by a residue having similar physiochemical characteristics. Examples of conservative substitutions include substitution of one aliphatic residue for another, such as Ile, Val, Leu, or Ala for one another, or substitutions of one polar residue for another, such as between Lys and Arg; Glu and Asp; or Gln and Asn. Other such conservative substitutions, for example, substitutions of entire regions having similar hydrophobicity characteristics, are well known. Naturally occurring IL-15 variants are also encompassed by the invention. Examples of such variants are proteins that result from alternate mRNA splicing events or from proteolytic cleavage of the IL-15 protein, wherein the IL-15 binding property is retained. Alternate splicing of mRNA may yield a truncated but biologically active IL-15 protein. Variations attributable to proteolysis include, for example, differences in the N- or C-termini upon expression in different types of host cells, due to proteolytic removal of one or more terminal amino acids from the IL-15 protein (generally from 1-10 amino acids). In some embodiments, the terminus of the protein can be modified to alter its physical properties, for example, with a chemical group such as polyethylene glycol (Yang, et al. *Cancer* 1995. 76:687-694). In some embodiments, the terminus or interior of the protein can be modified with additional amino acids (Clark-Lewis, et al. *PNAS* 1993. 90:3574-3577).

It will be appreciated that in certain embodiments, isolation of lymphocytes and/or γδ T cells according to the methods defined herein may further comprise culturing the non-haematopoietic tissue in the presence of at least one further cytokine. In certain embodiments, the methods defined herein may further comprise culturing the non-haematopoietic tissue in the presence of at least one additional agent, such as a chemokine. It will be further appreciated that chemokines will be selected depending on the γδ T cells or other lymphocytes being isolated. Furthermore, the chemokines will vary and be selected depending on the non-haematopoietic tissue used for isolation of the γδ T cells or lymphocytes.

In certain embodiments, the methods defined herein include IL-2 typically at a concentration of at least 10 IU/mL, such as at least 100 IU/mL (e.g., from 10 IU/mL to 1,000 IU/mL, from 20 IU/mL to 800 IU/mL, from 25 IU/mL to 750 IU/mL, from 30 IU/mL to 700 IU/mL, from 40 IU/mL to 600 IU/mL, from 50 IU/mL to 500 IU/mL, from 75 IU/mL to 250 IU/mL, or from 100 IU/mL to 200 IU/mL, e.g., from 10 IU/mL to 20 IU/mL, from 20 IU/mL to 30 IU/mL, from 30 IU/mL to 40 IU/mL, from 40 IU/mL to 50 IU/mL, from 50 IU/mL to 75 IU/mL, from 75 IU/mL to 100 IU/mL, from 100 IU/mL to 150 IU/mL, from 150 IU/mL to 200 IU/mL, from 200 IU/mL to 500 IU/mL, or from 500 IU/mL to 1,000 IU/mL). In certain embodiments, the methods defined herein include IL-2 typically at a concentration of less than 1,000 IU/mL, such as less than 500 IU/mL. In some embodiments, the methods include IL-2 at a concentration of about 100 IU/mL.

In further embodiments, the methods defined herein include IL-15 typically at a concentration of at least 0.1 ng/mL, such as at least 10 ng/mL (e.g., from 0.1 ng/mL to 10,000 ng/mL, from 1.0 ng/mL to 1,000 ng/mL, from 5 ng/mL to 800 ng/mL, from 10 ng/mL to 750 ng/mL, from 20 ng/mL to 500 ng/mL, from 50 ng/mL to 400 ng/mL, or from 100 ng/mL to 250 ng/mL, e.g., from 0.1 ng/mL to 1.0 ng/mL, from 1.0 ng/mL to 5.0 ng/mL, from 5.0 ng/mL to 10 ng/mL, from 10 ng/mL to 20 ng/mL, from 20 ng/mL to 100 ng/mL, from 20 ng/mL to 50 ng/mL, from 40 ng/mL to 70 ng/mL, from 50 ng/mL to 100 ng/mL, from 50 ng/mL to 60 ng/mL, from 100 ng/mL to 200 ng/mL, from 200 ng/mL to 500 ng/mL, or from 500 ng/mL to 1,000 ng/mL). In further embodiments, the methods defined herein include IL-15 typically at a concentration of less than 500 ng/mL, such as less 100 ng/mL. In some embodiments, the methods include IL-15 at a concentration of about 50 ng/mL.

In some embodiments, the isolation of lymphocytes and/or γδ T cells from the non-haematopoietic tissue sample includes culturing in the presence of both IL-2 and IL-15, each at any of the concentrations listed above. In some cases, the concentration of IL-2 is about 100 IU/mL, and the concentration of IL-15 is 55 ng/mL.

References herein to "non-haematopoietic tissues" or "non-haematopoietic tissue sample" include skin (e.g. human skin) and gut (e.g. human gut). Non-haematopoietic tissue is a tissue other than blood, bone marrow, or thymus tissue. In one embodiment, the non-haematopoietic tissue sample is skin (e.g. human skin). In a further embodiment, the non-haematopoietic tissue sample is gut or gastrointestinal tract (e.g. human gut or human gastrointestinal tract). In some embodiments, the lymphocytes and/or γδ T cells are not obtained from particular types of samples of biological fluids, such as blood or synovial fluid. In some embodiments, the non-haematopoietic tissue sample from which the lymphocytes and/or γδ T cells are isolated according to the methods defined herein is skin (e.g. human skin), which can be obtained by methods known in the art. Alternatively, the methods of isolation of lymphocytes and/or γδ T cells provided herein can be applied to the gastrointestinal tract (e.g. colon or gut), mammary gland, lung, prostate, liver, spleen, pancreas, uterus, vagina and other cutaneous, mucosal or serous membranes. The lymphocytes and/or γδ T cells may also be resident in human cancer tissue samples, e.g. tumours of the breast or prostate. In some embodiments, the lymphocytes and/or γδ T cells may be from human cancer tissue samples (e.g. solid tumour tissues). In other embodiments, the lymphocytes and/or γδ T cells may be from non-haematopoietic tissue sample other than human cancer tissue (e.g. a tissue without a substantial number of tumour cells). For example, the lymphocytes and/or γδ T cells may be from a region of skin (e.g. healthy skin) separate from a nearby or adjacent cancer tissue. Thus, in some embodiments, the γδ T cells are not obtained from human cancer tissue. In further embodiments, the lymphocytes are not obtained from a human cancer tissue.

In one embodiment the non-haematopoietic tissue sample of the methods defined herein has been obtained from a human. In an alternative embodiment, the non-haematopoietic tissue sample of the methods defined herein has been obtained from a non-human animal subject.

Methods for obtaining such tissues are known in the art. Examples of such methods include scalpel explant or punch biopsy and may vary in size according to the method. In some embodiments, the non-haematopoietic tissue sample is obtained by punch biopsy In some embodiments of the present invention, the non-haematopoietic tissue sample is an intact biopsy. References herein to "intact" biopsy or "explant" include tissue and tissue sample that is not substantially disrupted, or not disrupted, such that the structural integrity of the biopsy or explant has not been deliberately disrupted within the perimeter of the excision removing the biopsy or explant from the tissue sample. Such an intact biopsy or explant will have the three dimensional structure largely maintained except for minor disruption caused by handling. This intact biopsy or explant therefore has not been mechanically disrupted, such as by mincing or chopping, nor chemically enzymatically disrupted, for example. An intact biopsy or intact tissue sample may comprise the whole tissue, the complete tissue, a portion of the tissue or all elements of said tissue. For example, in one embodiment the intact biopsy comprises all layers of the skin. In a further embodiment, the biopsy comprises the epidermal and dermal layers of the skin. It will be appreciated that in such embodiments wherein the biopsy is intact, separation and distinction between such layers is maintained. Thus, references herein to "intact" additionally include biopsies of full thickness of the non-haematopoietic tissue sample.

Thus, in one particular embodiment of the present invention, the non-haematopoietic tissue sample is not minced. In further embodiments, the intact biopsy is a punch biopsy. In a yet further embodiment, the intact biopsy is obtained by punch biopsy. Embodiments presented herein where the non-haematopoietic tissue sample is an intact biopsy provide the surprising advantage of obtaining high numbers of isolated or separated cells from non-minced and/or intact non-haematopoietic tissue sample. Furthermore, cells obtained from non-minced and/or intact non-haematopoietic tissue sample according to the methods defined herein, as demonstrated herein, may retain a phenotype useful for subsequent expansion and/or engineering methods known in the art.

In a further embodiment the intact biopsy is skin (e.g. human skin) or the intact biopsy is gut (e.g. human gut). In one embodiment, the non-haematopoietic tissue sample has a minimum cross-section of at least 2 mm. It will be understood that "minimum cross-section" refers to the minimum or shortest length measured through the centroid of the tissue sample. It will be further understood that "maximum cross-section" refers to the maximum or longest length measured through the centroid of the tissue sample. The term "centroid" as used herein is the average or mean position of all points of the tissue sample. It will be appreciated that, according to further embodiments, the non-haematopoietic tissue sample has a minimum cross-section of at least 2 mm, at least 3 mm, at least 4 mm, at least at least 5 mm, at least 6 mm, at least 7 mm or at least 8 mm. In further embodiments, the non-haematopoietic tissue sample has a minimum cross section of 8 mm or less, 7 mm or less, 6 mm or less, 5 mm or less, 4 mm or less, or 3 mm or less. In one embodiment, the non-haematopoietic tissue sample has a minimum cross-section of between 2 mm and 8 mm (inclusive), such as between 2 mm and 4 mm. In one particular embodiment, the non-haematopoietic tissue sample has a minimum cross-section of about 3 mm. In one particular embodiment, the non-haematopoietic tissue sample has a cross-section of about 3 mm. It will be appreciated that, according to further embodiments, the non-haematopoietic tissue sample has a maximum cross-section of at least 2 mm, at least 3 mm, at least 4 mm, at least at least 5 mm, at least 6 mm, at least 7 mm or at least 8 mm. In further embodiments, the non-haematopoietic tissue sample has a maximum cross section of 8 mm or less, 7 mm or less, 6 mm or less, 5 mm or less, 4 mm or less, 3 mm or less or 2 mm or less. In one embodiment, the non-haematopoietic tissue sample has a maximum cross-section of between 1 mm and 8 mm (inclusive), such as between 2 mm and 4 mm. In one particular embodiment, the non-haematopoietic tissue sample has a maximum cross-section of about 3 mm.

According to further embodiments, the non-haematopoietic tissue sample has a minimum cross-sectional area of at least 2 $mm^2$. It will be understood that "minimum cross-sectional area" refers to the area of the smallest cross-section measured about the centroid of the tissue sample. It will be further understood that "maximum cross-sectional area" refers to the area of the largest cross-section measured about the centroid of the tissue sample. The term "centroid" as used herein is the average or mean position of all points of the tissue sample. In a further embodiment, the non-haematopoietic tissue sample has a minimum cross-sectional area of at least 2 $mm^2$, at least 3 $mm^2$, at least 4 $mm^2$, at least 5 $mm^2$, at least 6 $mm^2$, at least 7 $mm^2$, at least 8 $mm^2$, at least 9 $mm^2$ or at least 10 $mm^2$. In further embodiments, the non-haematopoietic tissue sample has a minimum cross-sectional area of 50 $mm^2$ or less, 40 $mm^2$ or less, 30 $mm^2$ or less, 25 $mm^2$ or less, 20 $mm^2$ or less, 15 $mm^2$ or less, 10 $mm^2$ or less or 8 $mm^2$ or less. In one embodiment, the non-haematopoietic tissue sample has a minimum cross-sectional area of between 2 $mm^2$ and 50 $mm^2$, such as between 3 $mm^2$ and 12 $mm^2$. In one particular embodiment, the non-haematopoietic tissue sample has a minimum cross-sectional area of about 7 $mm^2$. In a further embodiment, the non-haematopoietic tissue sample has a maximum cross-sectional area of at least 2 $mm^2$, at least 3 $mm^2$, at least 4 $mm^2$, at least 5 $mm^2$, at least 6 $mm^2$, at least 7 $mm^2$, at least 8 $mm^2$, at least 9 $mm^2$ or at least 10 $mm^2$. In further embodiments, the non-haematopoietic tissue sample has a maximum cross-sectional area of 50 $mm^2$ or less, 40 $mm^2$ or less, 30 $mm^2$ or less, 25 $mm^2$ or less, 20 $mm^2$ or less, 15 $mm^2$ or less, 10 $mm^2$ or less or 8 $mm^2$ or less. In one embodiment, the non-haematopoietic tissue sample has a maximum cross-sectional area of between 1 $mm^2$ and 50 $mm^2$, such as between 3 $mm^2$ and 12 $mm^2$. In one particular embodiment, the non-haematopoietic tissue sample has a maximum cross-sectional area of about 7 $mm^2$.

According to further embodiments, the non-haematopoietic tissue sample has a volume of at least 2 $mm^3$. In a further embodiment, the non-haematopoietic tissue sample has a volume of at least 4 $mm^3$, at least 5 $mm^3$, at least 8 $mm^3$, at least 10 mm³, at least 15 mm³, at least 20 mm³, at least 25 mm³, at least 30 mm³, at least 35 mm³, at least 40 mm³, at least 50 mm³, or at least 60 mm³. In further embodiments, the non-haematopoietic tissue sample has a volume of 250 mm³ or less, 200 mm³ or less, such as 180 mm³ or less, 1600 mm³ or less, 140 mm³ or less, 120 mm³ or less, 100 mm³ or less, 80 mm³ or less, 60 mm³ or less, 50 mm³ or less or 40 mm³ or less. In one embodiment, the non-haematopoietic tissue sample has volume of between 5 mm³ and 250 mm³, such as between 15 mm³ and 65 mm³. In one particular embodiment, the non-haematopoietic tissue sample has a volume of about 35 mm³.

In one embodiment, the non-haematopoietic tissue sample is a punch biopsy. A punch biopsy may be of any shape, though is conveniently of circular cross-section and suitably is at least 1 mm in diameter. In yet further embodiments, the non-haematopoietic tissue sample comprises a punch biopsy at least 2 mm in diameter, such as at least 3 mm in diameter, at least 4 mm in diameter, at least 5 mm in diameter, at least 6 mm in diameter, at least 7 mm in diameter or at least 8 mm in diameter. In further embodiments, the non-haematopoietic tissue sample comprises a punch biopsy 8 mm or less in diameter, such as 7 mm or less in diameter, 6 mm or less in diameter, 5 mm or less in diameter or 3 mm or less in diameter. In one embodiment, the non-haematopoietic tissue sample comprises a punch biopsy of between 1 mm and 8 mm in diameter, such as between 2 mm and 4 mm in diameter. In a particular embodiment, the non-haematopoietic tissue sample comprises a punch biopsy of 3 mm in diameter.

In certain embodiments, the non-haematopoietic tissue sample comprises a biopsy (e.g. a punch biopsy, in particular a punch biopsy of circular cross-section) according to the sizes, areas, volumes and/or diameters defined above and the maximum depth is determined by the site from which the biopsy is obtained (although the depth may be reduced). In one embodiment, the biopsy is a skin biopsy and comprises the epidermal and dermal layers. In a further embodiment, the biopsy does not substantially comprise the subcutaneous fat. Thus, in one embodiment, the biopsy comprises epidermal and dermal layers and does not substantially comprise a layer of subcutaneous fat. In a further embodiment, the biopsy comprises no subcutaneous fat.

Alternatively, the subcutaneous fat is not removed, therefore is present (or at least partially present) in the biopsy. Thus, in a yet further embodiment, the biopsy consists of epidermal and dermal layers. In one embodiment, the biopsy comprises the full thickness of the non-haematopoietic tissue sample.

Thus, according to one aspect of the invention, there is provided a method for the isolation of lymphocytes from a non-haematopoietic tissue sample comprising the steps of:
(i) culturing a non-haematopoietic tissue sample which is an intact biopsy with a minimum cross-sectional area of at least 2 mm² in the presence of IL-2 and IL-15; and
(ii) collecting the lymphocytes from the non-haematopoietic tissue.

According to a further aspect of the invention, there is provided a method for the isolation of γδ T cells from a non-haematopoietic tissue sample comprising the steps of:
(i) culturing a non-haematopoietic tissue sample which is an intact biopsy with a minimum cross-sectional area of at least 2 mm² in the presence of IL-2 and IL-15; and
(ii) collecting the γδ T cells from the non-haematopoietic tissue sample.

According to one aspect of the invention, there is provided a method for the isolation of lymphocytes from a non-haematopoietic tissue sample comprising the steps of:
(i) culturing a non-haematopoietic tissue sample which is an intact biopsy with volume of at least 2 mm³ in the presence of IL-2 and IL-15; and
(ii) collecting the lymphocytes from the non-haematopoietic tissue.

According to a yet further aspect of the invention, there is provided a method for the isolation of γδ T cells from a non-haematopoietic tissue sample comprising the steps of:
(i) culturing a non-haematopoietic tissue sample which is an intact biopsy with volume of at least 2 mm³ in the presence of IL-2 and IL-15; and
(ii) collecting the γδ T cells from the non-haematopoietic tissue sample.

Methods of the present invention comprise culturing non-haematopoietic tissue sample as defined herein. References herein to "culturing" include the addition of cells and/or a non-haematopoietic tissue sample, including isolated, separated, removed, purified or enriched cells from non-haematopoietic tissue sample, to media comprising growth factors and/or essential nutrients required and/or preferred by the cells and/or non-haematopoietic tissue sample. It will be appreciated that such culture conditions may be adapted according to the cells or cell population to be isolated from the non-haematopoietic tissue sample according to the invention or may be adapted according to the cells or cell population to be isolated and expanded from the non-haematopoietic tissue sample.

In certain embodiments, culturing of the non-haematopoietic tissue sample is for a duration of time sufficient for the isolation of γδ T cells from the non-haematopoietic tissue sample. In alternative embodiments, the culturing of non-haematopoietic tissue sample is for a duration of time sufficient for the isolation of lymphocytes other than γδ T cells from the non-haematopoietic tissue sample (e.g. αβ T cells and/or NK (natural killer) cells). In certain embodiments, the duration of culture according to the methods defined herein is at least 14 days. In certain embodiments, the duration of culture according to the methods defined herein is less than 45 days, such as less than 30 days, such as less than 25 days. In a further embodiment, the duration of culture according to the methods defined herein is between 14 days and 35 days, such as between 14 days and 21 days. In a yet further embodiment, the duration of culture according to the methods defined herein is about 21 days.

In particular embodiments of the present invention, the lymphocytes and/or γδ T cells isolated according to methods as defined herein are collected from the culture of non-haematopoietic tissue sample after culturing of the non-haematopoietic tissue sample. Collection of the lymphocytes and/or γδ T cells as defined herein may include the physical collection of lymphocytes and/or γδ T cells from the culture, isolation of the lymphocytes and/or γδ T cells from other lymphocytes (e.g. αβ T cells, γδ T cells and/or NK cells) or isolation and/or separation of the lymphocytes and/or γδ T cells from stromal cells (e.g. fibroblasts). In one embodiment, lymphocytes and/or γδ T cells are collected by mechanical means (e.g. pipetting). In a further embodiment, lymphocytes and/or γδ T cells are collected by means of magnetic separation and/or labelling. In a yet further embodiment, the lymphocytes and/or γδ T cells are collected by flow cytometric techniques such as FACS. Thus, in certain embodiments, the γδ T cells are collected by means of specific labelling the γδ T cells. In further embodiments, the lymphocytes are collected by means of specific labelling of the lymphocytes to distinguish them from other cells within the culture. It will be appreciated that such collection of lymphocytes and/or γδ T cells may include the physical removal from the culture of the non-haematopoietic tissue sample, transfer to a separate culture vessel or to separate or different culture conditions.

It will be appreciated that such collecting of lymphocytes and/or γδ T cells is performed after a duration of time sufficient to achieve an isolated population of lymphocytes and/or γδ T cells from the non-haematopoietic tissue sample. In certain embodiments, the lymphocytes and/or γδ T cells are collected after at least one week, at least 10 days, at least 11 days, at least 12 days, at least 13 days or at least 14 days of culturing of the non-haematopoietic tissue sample. Suitably, the lymphocytes and/or γδ T cells are collected after 40 days or less, such as 38 days or less, 36 days or less, 34 days or less, 32 days or less, 30 days or less, 28 days or less, 26 days or less or 24 days or less. In one embodiment, the lymphocytes and/or γδ T cells are collected after at least 14 days of culturing of the non-haematopoietic tissue sample. In a further embodiment, the lymphocytes and/or γδ T cells are collected after 14 to 21 days of culturing of the non-haematopoietic tissue sample.

In certain embodiments of the present invention, the non-haematopoietic tissue sample is cultured in media which is substantially free of serum (e.g. serum-free media or media containing a serum-replacement (SR)). Thus, in one embodiment, the non-haematopoietic tissue sample is cultured in serum-free media. Such serum free medium may also include serum replacement medium, where the serum replacement is based on chemically defined components to avoid the use of human or animal derived serum. In an alternative embodiment, the non-haematopoietic tissue sample is cultured in media which contains serum (e.g. human AB serum or fetal bovine serum (FBS)). In one embodiment, the non-haematopoietic tissue sample is cultured in media which contains serum-replacement. In one embodiment, the non-haematopoietic tissue sample is cultured in media which contains no animal-derived products.

It will be appreciated that embodiments according to the invention wherein the non-haematopoietic tissue sample is cultured in serum-free media have the advantage of avoiding issues with filtration, precipitation, contamination and supply of serum. Furthermore, animal derived products are not favoured for use in clinical grade manufacturing of human therapeutics. As can be seen herein, the inventors have also surprisingly found that the use of serum-free media for the isolation of cells, particularly Vδ1 γδ cells, substantially increases the number of cells obtained from non-haematopoietic tissue sample compared to the use of media containing AB serum. In particular, isolation of γδ T cells from non-haematopoietic tissue sample cultured in serum-free media increases the yield of Vδ1 cells.

In one embodiment, the methods as defined herein are performed in an isolation vessel. Reference to an "isolation vessel" refers to a vessel comprising the non-haematopoietic tissue sample for separation of the lymphocytes and/or γδ T cells, optionally further comprising a synthetic scaffold. It will be noted that the isolation vessel may be used just for the isolation method and not for the further expansion steps.

In one embodiment, the methods as defined herein are performed in a vessel (e.g. an isolation vessel) comprising a gas permeable material. Such materials are permeable to gases such as oxygen, carbon dioxide and/or nitrogen to allow gaseous exchange between the contents of the vessel and the surrounding atmosphere. It will be appreciated that references herein to "vessel" include culture dishes, culture plates, single-well dishes, multi-well dishes, multi-well plates, flasks, multi-layer flasks, bottles (such as roller bottles), bioreactors, bags, tubes and the like. Such vessels are known in the art for use in methods involving expansion of non-adherent cells and other lymphocytes. However, as shown herein, vessels comprising a gas permeable material also surprisingly find utility in the isolation of γδ T cells which are considered as usually being adherent. The use of such vessels for culturing was found to greatly increase the yield of isolated γδ T cells from non-haematopoietic tissue sample. Such vessels were also found to preferentially support γδ T cells and other lymphocytes over fibroblasts and other stromal cells (e.g. epithelial cells), including adherent cell-types. Thus, in one embodiment, the vessels comprising a gas permeable material as defined herein preferentially support γδ T cells and other lymphocytes (e.g. αβ T cells and/or NK cells). In a further embodiment, fibroblasts and/or other stromal cells (e.g. epithelial cells) are absent from cultures performed in vessels comprising a gas permeable material.

Such vessels comprising gas permeable materials may additionally comprise a gas permeable material that is non-porous. Thus, in one embodiment, the gas permeable material in non-porous. In some embodiments, the gas permeable material is a membrane film such as silicone, fluoroethylene polypropylene, polyolefin, or ethylene vinyl acetate copolymer. Furthermore, such vessels may comprise only a portion of gas permeable material, gas permeable membrane film or non-porous gas permeable material. Thus, according to a yet further embodiment, the vessel includes a top, a bottom and at least one sidewall, wherein at least part of the said vessel bottom comprises a gas permeable material that is in a substantially horizontal plane when said top is above said bottom. In one embodiment, the vessel includes a top, a bottom, and at least one sidewall, wherein at least a part of said bottom comprises the gas permeable material that is in a horizontal plane when said top is above said bottom. In a further embodiment, the vessel includes a top, a bottom and at least one sidewall, wherein the said at least one sidewall comprises a gas permeable material which may be in a vertical plane when said top is above said bottom, or may be a horizontal plane when said top is not above said bottom. It will be appreciated that in such embodiments, only a portion of said bottom or said side wall may comprise a gas permeable material. Alternatively, the entire of said bottom or entire of said sidewall may comprise a gas permeable material. In a yet further embodiment, said top of said vessel comprising a gas permeable material may be sealed, for example by utilisation of an O-ring. Such embodiments will be appreciated to prevent spillage or reduce evaporation of the vessel contents. Thus, in certain embodiments, the vessel comprises a liquid sealed container comprising a gas permeable material to allow gas exchange. In alternative embodiments, said top of said vessel comprising a gas permeable material is in the horizontal plane and above said bottom and is not sealed. Thus, in certain embodiments, said top is configured to allow gas exchange from the top of the vessel. In further embodiments, said bottom of the gas permeable container is configured to allow gas exchange from the bottom of the vessel. In a yet further embodiment, said vessel comprising a gas permeable material may be a liquid sealed container and further comprise inlet and outlet ports or tubes. Thus, in certain embodiments, the vessel comprising a gas permeable material includes a top, a bottom and optionally at least one sidewall, wherein at least a part of said top and said bottom comprise a gas permeable material and, if present, at least part of the at least one sidewall comprises a gas permeable material. Example vessels are described in WO2005035728 and U.S. Pat. No. 9,255,243 which are herein incorporated by reference. These vessels are also commercially available, such as the G-REX® cell culture devices provided by Wilson Wolf Manufacturing, such as the G-REX6 well-plate, G-REX24 well-plate and the G-REX10 vessel.

Thus, according to one aspect of the invention, there is provided a method for the isolation of lymphocytes from a non-haematopoietic tissue sample comprising the steps of:
(i) placing a non-haematopoietic tissue sample in a vessel comprising a gas permeable material;
(ii) culturing the non-haematopoietic tissue sample in the presence of IL-2 and IL-15; and
(iii) collecting a population of lymphocytes cultured from the non-haematopoietic tissue sample.

According to a further aspect of the invention, there is provided a method for the isolation of γδ T cells from a non-haematopoietic tissue sample comprising the steps of:
(i) placing a non-haematopoietic tissue sample in a vessel comprising a gas permeable material;
(ii) culturing the non-haematopoietic tissue sample in the presence of IL-2 and IL-15; and
(iii) collecting a population of γδ T cells cultured from the non-haematopoietic tissue sample.

In one embodiment, the non-haematopoietic tissue sample is placed on a synthetic scaffold. As used herein, a "synthetic scaffold," "scaffold," and "grid" are used interchangeably and refer to a non-native three-dimensional structure suitable to support cell growth. A non-haematopoietic tissue sample may be either placed on or adhered to a synthetic scaffold to facilitate lymphocyte egress from the explant onto the scaffold. Synthetic scaffolds may be constructed from natural and/or synthetic materials such as polymers (e.g. natural or synthetic polymers, such as poly vinyl pyrolidones, polymethylmethacrylate, methyl cellulose, polystyrene, polypropylene, polyurethane), ceramics (e.g. tricalcium phosphate, calcium aluminate, calcium hydroxyapatite), or metals (e.g. tantalum, titanium, platinum and metals in the same element group as platinum, niobium, hafnium, tungsten and combinations of alloys thereof). In one embodiment of the present invention, the synthetic scaffold is tantalum coated. Biological factors (e.g. collagens (such as collagen I or collagen II), fibronectins, laminins, integrins, angiogenic factors, anti-inflammatory factors, glycosaminoglycans, vitrogens, antibodies and fragments thereof, cytokines (e.g. IL-2, IL-15 and combinations thereof) may be coated onto the scaffold surface, encapsulated within the scaffold material or added to the media to enhance cell adhesion, migration, survival, or proliferation, according to methods known in the art. This and other methods can be used to isolate lymphocytes from a number of other non-haematopoietic tissue types, e.g. skin, gut, prostate and breast.

In one embodiment, the non-haematopoietic tissue sample is placed on a synthetic scaffold inside the vessel used to isolate lymphocytes from the non-haematopoietic tissue sample. In a further embodiment, the synthetic scaffold is configured to facilitate lymphocyte and/or γδ T cell egress from the non-haematopoietic tissue sample to the bottom of the vessel. Such an embodiment has the advantage of allowing the isolation and/or separation of lymphocytes (e.g. γδ T cells, αβ T cells and/or NK cells) from the non-haematopoietic tissue sample and/or stromal cells (e.g. fibroblasts and/or epithelial cells). Furthermore, such embodiments allow the collection of lymphocytes (e.g. γδ T cells, αβ T cells and/or NK cells) from the non-haematopoietic tissue sample to the bottom of the culture vessel. In a particular embodiment, the synthetic scaffold is configured to facilitate the egress of γδ T cells from the non-haematopoietic tissue sample. In a further embodiment, the synthetic scaffold is configured to facilitate the egress of lymphocytes, such as αβ T cells and/or NK cells from the non-haematopoietic tissue sample.

Thus, in one aspect of the methods defined herein, the synthetic scaffold is configured to facilitate lymphocyte egress from the non-haematopoietic tissue sample to the bottom of the culture vessel. In a further aspect of the methods defined herein, synthetic scaffold is configured to facilitate γδ T cell egress from the non-haematopoietic tissue sample to the bottom of the vessel.

The methods of the present invention provide a total cell yield far greater than previously described. In one embodiment, the total isolated cell number is at least $10^5$ cells/cm$^2$, at least $2\times10^6$ cells/cm$^2$, at least $5\times10^6$ cells/cm$^2$, at least $10\times10^6$ cells/cm$^2$, at least $20\times10^6$ cells/cm$^2$, at least $30\times10^6$ cells/cm$^2$, at least $40\times10^6$ cells/cm$^2$, at least $50\times10^6$ cells/cm$^2$, at least $60\times10^6$ cells/cm$^2$, at least $70\times10^6$ cells/cm$^2$, at least $80\times10^6$ cells/cm$^2$, at least $90\times10^6$ cells/cm$^2$, at least $100\times10^6$ cells/cm$^2$, at least $150\times10^6$ cells/cm$^2$, at least $200\times10^6$ cells/cm$^2$ of the tissue sample. In a specific embodiment, the total isolated cell number is at least at least $50\times10^6$ cells/cm$^2$. In another embodiment, the total isolated cell number is at least at least $100\times10^6$ cells/cm$^2$.

γδ T cells that are dominant in the blood are primarily Vδ2 T cells, while the γδ T cells that are dominant in the non-haematopoietic tissues are primarily Vδ1 T cells, such that Vδ1 T cells comprise about 70-80% of the non-haematopoietic tissue-resident γδ T cell population. However, some Vδ2 T cells are also found in non-haematopoietic tissues, e.g. in the gut, where they can comprise about 10-20% of γδ T cells. Some γδ T cells that are resident in non-haematopoietic tissues express neither Vδ1 nor Vδ2 TCR and have been referred to herein as double negative (DN) γδ T cells. These DN γδ T cells are likely to be mostly Vδ3-expressing with a minority of Vδ5-expressing T cells. Therefore, the γδ T cells that are ordinarily resident in non-haematopoietic tissues and that are isolated by the method of the invention are preferably non-Vδ2 T cells, e.g. Vδ1 T cells, with the inclusion of a smaller amount of DN γδ T cells.

Thus, in one preferred embodiment, the γδ T cells isolated by the methods defined herein comprise a population of Vδ1 T cells. In one embodiment, the γδ T cells isolated by the methods defined herein comprise a population of DN γδ T cells. In one embodiment, the γδ T cells isolated by the methods defined herein comprise a population of Vδ3 T cells. In one embodiment, the γδ T cells isolated by the methods defined herein comprise a population of Vδ5 T cells.

γδ T cells may also be defined by the type of γ chain that they express. In a further embodiment, the γδ T cells isolated by the methods defined herein comprise a population of Vγ4 T cells. Most often, Vγ4 T cells are obtained from gut tissue samples.

Methods of isolation provide an isolated population of γδ T cells that is greater in number than a reference population (e.g. at least 2-fold in number, at least 3-fold in number, at least 4-fold in number, at least 5-fold in number, at least 6-fold in number, at least 7-fold in number, at least 8-fold in number, at least 9-fold in number, at least 10-fold in number, at least 15-fold in number, at least 20-fold in number, at least 25-fold in number, at least 30-fold in number, at least 35-fold in number, at least 40-fold in number, at least 50-fold in number, at least 60-fold in number, at least 70-fold in number, at least 80-fold in number, at least 90-fold in number, at least 100-fold in number, at least 200-fold in number, at least 300-fold in number, at least 400-fold in number, at least 500-fold in number, at least 600-fold in number, at least 700-fold in number, at least 800-fold in number, at least 900-fold in number, at least 1,000-fold in number at least 5,000-fold in number, at least 10,000-fold in number).

In some embodiments, the population of γδ T cells isolated according to methods of the invention has a low proportion of cells expressing TIGIT. For example, the isolated population of γδ T cells may have a frequency of TIGIT+ cells of less than 90%, less than 80%, less than 70%, less than 60%, less than 50%, less than 40%, less than 30%, less than 20% or less than 10%. Alternatively, the isolated population of γδ T cells may have a frequency of TIGIT+ cells of about 90%, about 80%, about 70%, about 60%, about 50%, about 40%, about 30%, about 20% or about 10%. In certain embodiments, the isolated population of γδ T cells has a frequency of TIGIT+ cells of less than 80%. Thus, in one embodiment, the isolated population of γδ T cells has a frequency of TIGIT+ cells of about 70%. In a further embodiment, the isolated population of γδ T cells has a frequency of TIGIT+ cells of less than 60%. In a yet further embodiment, the isolated population of γδ T cells has a frequency of TIGIT+ cells of about 30%. Thus, in one embodiment the isolated γδ T cells do not substantially express TIGIT.

In some embodiments, the isolated population of Vδ1 T cells has a low frequency of TIGIT+ cells. For example, the isolated population of Vδ1 T cells may have a frequency of TIGIT+ cells than other populations of Vδ1 T cells of less than 90%, less than 80%, less than 70%, less than 60%, less than 50%, less than 40%, less than 30%, less than 20% or less than 10%. Alternatively, the isolated population of Vδ1 T cells may have a frequency of TIGIT+ cells of about 90%, about 80%, about 70%, about 60%, about 50%, about 40%, about 30%, about 20% or about 10%. In certain embodiments, the isolated population of Vδ1 T cells has a frequency of TIGIT+ cells of less than 80%. Thus, in one embodiment, the isolated population of Vδ1 T cells has a frequency of TIGIT+ cells of about 70%. In a further embodiment, the isolated population of Vδ1 T cells has a frequency of TIGIT+ cells of less than 60%. In a yet further embodiment, the isolated population of Vδ1 T cells has a frequency of TIGIT+ cells of about 30%. Thus, in one embodiment the isolated Vδ1 T cells do not substantially express TIGIT.

In some embodiments, the population of γδ T cells isolated according to the methods of the invention expresses CD27. For example, the isolated population of γδ T cells may have a frequency of CD27+ cells of greater than 10%, greater than 20%, greater than 30%, greater than 40%, greater than 50%, greater than 60%, greater than 70%, greater than 80% or greater than 90%. Alternatively, the isolated population of γδ T cells may have a frequency of CD27+ cells of about 10%, about 20%, about 30%, about 40%, about 50%, about 60%, about 70%, about 80% or about 90%. In certain embodiments, the isolated population of γδ T cells has a frequency of CD27+ cells of greater than 10%. Thus, in one embodiment, the isolated population of γδ T cells has a frequency of CD27+ cells of about 20%. In a further embodiment, the isolated population of γδ T cells has a frequency of CD27+ cells greater than 20%. In one embodiment, the isolated population of γδ T cells has a frequency of CD27+ cells of about 20%.

In some embodiments, the isolated population of Vδ1 T cells expresses CD27. In a further embodiment, the isolated γδ T cells express CD27. In some embodiments, the isolated population of Vδ1 T cells has a frequency of CD27+ cells of greater than 10%, greater than 20%, greater than 30%, greater than 40%, greater than 50%, greater than 60%, greater than 70%, greater than 80% or greater than 90%. Alternatively, the isolated population of γδ T cells may have a frequency of CD27+ cells of about 10%, about 20%, about 30%, about 40%, about 50%, about 60%, about 70%, about 80% or about 90%. In certain embodiments, the isolated population of Vδ1 T cells has a frequency of CD27+ cells of greater than 10%. Thus, in one embodiment, the isolated population of Vδ1 T cells has a frequency of CD27+ cells of about 20%. In a further embodiment, the isolated population of Vδ1 T cells has a frequency of CD27+ cells greater than 20%. In one embodiment, the isolated population of Vδ1 T cells has a frequency of CD27+ cells of about 20%.

In some embodiments of any of the preceding aspects, the isolated population of γδ T cells has a greater surface expression of one or more of the markers selected from the group consisting of CD124, CD215, CD360, CTLA4, CD1b, BTLA, CD39, CD45RA, Fas Ligand, CD25, ICAM-1, CD31, KLRG1, CD30, and CD2, relative to a reference population (e.g. relative to a population of γδ T cells isolated using alternative methods). Additionally or alternatively, the isolated population of γδ T cells may have a greater frequency of cells expressing one or more of the markers selected from the group consisting of CD124, CD215, CD360, CTLA4, CD1b, BTLA, CD39, CD45RA, Fas Ligand, CD25, ICAM-1, CD31, KLRG1, CD30, and CD2, relative to a reference population. In particular, the markers are selected from CD45RA and CD25. In some embodiments, the isolated population of γδ T cells has a lower surface expression of one or more of the markers selected from the group consisting of NKp44, NKp46, ICAM-2, CD70, CD28, CD103, NKp30, LAG3, CCR4, CD69, PD-1, and CD64, relative to a reference population. Additionally or alternatively, the isolated population of γδ T cells may have a lower frequency of cells expressing one or more of the markers selected from the group consisting of NKp44, NKp46, ICAM-2, CD70, CD28, CD103, NKp30, LAG3, CCR4, CD69, PD-1, and CD64, relative to a reference population.

In some embodiments, the isolated population of Vδ1 T cells has a greater surface expression of one or more of the markers selected from the group consisting of CD124, CD215, CD360, CTLA4, CD1b, BTLA, CD39, CD45RA, Fas Ligand, CD25, ICAM-1, CD31, KLRG1, CD30, and CD2, relative to a reference population. In some embodiments, the isolated population of γδ T cells has a greater frequency of cells expressing one or more of the markers selected from the group consisting of CD124, CD215, CD360, CTLA4, CD1b, BTLA, CD39, CD45RA, Fas Ligand, CD25, ICAM-1, CD31, KLRG1, CD30, and CD2, relative to a reference. In some embodiments, the isolated population of γδ T cells has a lower surface expression of one or more of the markers selected from the group consisting of NKp44, NKp46, ICAM-2, CD70, CD28, CD103, NKp30, LAG3, CCR4, CD69, PD-1, and CD64, relative to a reference population. In other embodiments, the isolated population of γδ T cells has a lower frequency of cells expressing one or more of the markers selected from the group consisting of NKp44, NKp46, ICAM-2, CD70, CD28, CD103, NKp30, LAG3, CCR4, CD69, PD-1, and CD64, relative to a reference population.

Upon isolation from non-haematopoietic tissue (e.g. skin), the γδ T cells will generally be part of a larger population of lymphocytes containing, for example, αβ T cells, B cells, and natural killer (NK) cells. In some embodiments, 1%-10% of the isolated population of lymphocytes are γδ T cells (e.g. 1-10% of the isolated population of skin-derived lymphocytes are γδ T cells). In most cases, the γδ T cell population (e.g. skin-derived γδ T cell population) will include a large population of Vδ1 T cells. In some embodiments, 1-10% of the isolated population of lymphocytes (e.g. skin-derived lymphocytes) are Vδ1 T cells (e.g. Vδ1 T cells may represent over 50%, over 60%, over 70%, over 80%, or over 90% of the population of an isolated population γδ T cells). In some instances, less than 10% of the isolated population of γδ T cells are Vδ2 T cells (e.g. less than 10% of the isolated population of skin-derived γδ T cells are Vδ2 T cells).

Non-Vδ1 T cells or non-DN T cells, such as Vδ2 T cells, αβ T cells, B cells, or NK cells, may be removed from the isolated population of the γδ T cells (e.g. prior to, during, or after an expansion step).

Isolated γδ T cells (e.g. γδ T cells isolated from skin, e.g. Vδ1 T cells isolated from skin) have a distinct phenotype from corresponding haematopoietic tissue-derived cells (e.g. blood-derived γδ T cells and/or blood-derived Vδ2 T cells). For example, the isolated population of γδ T cells may express a higher level of CCR3, CCR4, CCR7, CCR8, or CD103 than a reference population, e.g. a TCR activated population of non-haematopoietic tissue-resident γδ T cells or a corresponding population of haematopoietic tissue-derived cells (e.g. blood-derived γδ T cells and/or blood-derived Vδ2 T cells). In some embodiments, the isolated population of γδ T cells includes at least 5%, 10%, 15%, 20%, 25%, 30%, 40%, 50%, 60%, 70%, 80%, 90% or more CCR3$^+$ cells; at least 5%, 10%, 15%, 20%, 25%, 30%, 40%, 50%, 60%, 70%, 80%, 90% or more CCR4$^+$ cells; at least 5%, 10%, 15%, 20%, 25%, 30%, 40%, 50%, 60%, 70%, 80%, 90% or more CCR7$^+$ cells; at least 5%, 10%, 15%, 20%, 25%, 30%, 40%, 50%, 60%, 70%, 80%, 90% or more CCR8$^+$ cells; and/or at least 5%, 10%, 15%, 20%, 25%, 30%, 40%, 50%, 60%, 70%, 80%, 90% or more CD103$^+$ cells. The isolated population of γδ T cells may express one or more, two or more, three or more, four or more, five or more, or all six of CCR3, CCR4, CCR7, CCR8, or CD103.

In some embodiments, the isolated population of γδ T cells (e.g. skin-derived γδ T cells and/or skin-derived Vδ1 T cells) expresses a higher level of NKGD2, CD56, CD69, and/or TIM3 than a reference population, e.g. a TCR activated population of non-haematopoietic tissue-resident γδ T cells and/or a corresponding population of haematopoietic tissue-derived cells (e.g. blood-derived γδ T cells and/or blood-derived Vδ2 T cells). In some embodiments, the isolated population of γδ T cells includes at least 5%, 10%, 15%, 20%, 25%, 30%, 40%, 50%, 60%, 70%, 80%, 90% or more NKGD2$^+$ cells; at least 5%, 10%, 15%, 20%, 25%, 30%, 40%, 50%, 60%, 70%, 80%, 90% or more CD56$^+$ cells; at least 5%, 10%, 15%, 20%, 25%, 30%, 40%, 50%, 60%, 70%, 80%, 90% or more CD69$^+$ cells; and/or at least 5%, 10%, 15%, 20%, 25%, 30%, 40%, 50%, 60%, 70%, 80%, 90% or more TIM3$^+$ cells. The isolated population of γδ T cells may express one or more, two or more, three or more, four or more, or all five of NKGD2, CD56, CD69, and/or TIM3.

The isolated population of non-haematopoietic tissue-derived γδ T cells (e.g. skin-derived γδ T cells and/or skin-derived Vδ1 T cells) can also be characterised by function. Functional assays known in the art can be performed to determine the functional differences between any non-haematopoietic tissue-derived cell of the invention (e.g. an isolated population of γδ T cells, skin-derived Vδ1 T cells, or an expanded population of γδ T cells and/or skin-derived Vδ1 T cells) and a reference cell (e.g. a TCR activated population of non-haematopoietic tissue-resident γδ T cells or a corresponding population of haematopoietic tissue-derived cells, e.g. blood-derived γδ T cells and/or blood-derived Vδ2 T cells). Such assays may include proliferation assays, cytotoxicity assays, binding assays, assays the measure persistence and/or location, etc.

Thus, in one aspect of the invention, the methods as defined herein for isolating a lymphocyte and/or γδ T cell population yields a population comprising a surface phenotype consistent with a non-exhausted lymphocyte and/or γδ T cell population.

According to one aspect of the invention, there is provided an isolated population of lymphocytes (e.g. skin-derived αβ T cells and/or NK cells) obtainable by any of the methods defined herein.

According to one aspect of the invention, there is provided an isolated population of lymphocytes (e.g. skin-derived αβ T cells and/or NK cells) obtained by any of the methods defined herein.

According to a further aspect of the invention, there is provided an isolated population of γδ T cells obtained by any of the methods defined herein.

According to a further aspect of the invention, there is provided an isolated population of γδ T cells obtainable by any of the methods defined herein.

In one embodiment, the isolated population comprises greater than 5% γδ T cells, such as between 7% and 12% γδ T cells. In one embodiment, the isolated population comprises Vδ1 cells, wherein less than 50%, such as less than 40% of the Vδ1 cells express TIGIT. In one embodiment, the isolated population comprises Vδ1 cells, wherein more than 50%, such as more than 60% of the Vδ1 cells express CD27.

The isolated non-haematopoietic tissue-resident lymphocytes may be suitable for use without further expansion, or they may be expanded in a further step.

In certain embodiments, the invention features methods of expanding non-haematopoietic tissue-resident lymphocytes and/or γδ T cells (e.g. skin-derived αβ T cells, NK cells, γδ T cells and/or non-Vδ2 T cells, such as Vδ1 T cells and/or DN T cells). These methods may be carried out in vitro. In some embodiments, the γδ T cells are expanded from a population of γδ T cells that has been isolated from non-haematopoietic tissue sample according to methods defined herein. In general, non-haematopoietic tissue-resident γδ T cells are capable of spontaneously expanding upon removal of physical contact with stromal cells (e.g. skin fibroblasts). The methods defined herein can be used to induce such separation, resulting in de-repression of the γδ T cells to trigger expansion. In certain embodiments, lymphocytes (e.g. skin-derived αβ T cells and/or NK cells, gut-derived αβ T cells and/or NK cells) are expanded from a population of lymphocytes that has been isolated from non-haematopoietic tissue sample according to the methods defined herein.

As used herein, references to "expanded" or "expanded population of lymphocytes and/or γδ T cells" includes populations of cells which are larger or contain a larger number of cells than a non-expanded population. Such populations may be large in number, small in number or a mixed population with the expansion of a proportion or particular cell type within the population. It will be appreciated that the term "expansion step" refers to processes which result in expansion or an expanded population. Thus, expansion or an expanded population may be larger in number or contain a larger number of cells compared to a population which has not had an expansion step performed or prior to any expansion step. It will be further appreciated that any numbers indicated herein to indicate expansion (e.g. fold-increase or fold-expansion) are illustrative of an increase in the number or size of a population of cells or the number of cells and are indicative of the amount of expansion.

Thus, in one embodiment, the lymphocytes and/or γδ T cells isolated according to methods of the invention are expanded. Such expansion may comprise culturing the γδ T cells in the presence of IL-2 and IL-15. Alternatively, expansion may comprise culturing the γδ T cells in the presence of IL-9 and IL-15. It will be appreciated that any expansion step is performed for a duration of time effective to produce an expanded population of lymphocytes and/or γδ T cells. In one embodiment, a duration of time effective to produce an expanded population of lymphocytes and/or γδ T cells is at least 5 days. Thus, in one embodiment, expansion comprises culturing the γδ T cells in the presence of IL-2 and IL-15 for at least 5 days in amounts effective to produce an expanded population of γδ T cells. In an alternative embodiment, expansion comprises culturing the γδ T cells in the presence of IL-9 and IL-15 for at least 5 days in amounts effective to produce an expanded population of γδ T cells. In further embodiments, expansion comprises culturing the lymphocytes and/or γδ T cells for a duration (e.g. at least 5 days, at least 6 days, at least 7 days, at least 8 days, at least 9 days, at least 10 days, at least 11 days, at least 12 days, at least 13 days, at least 14 days, at least 21 days, at least 28 days, or longer, e.g. from 5 days to 40 days, from 7 days to 35 days, from 14 days to 28 days, or about 21 days) in an amount effective to produce an expanded population of lymphocytes and/or γδ T cells. In some embodiments, the lymphocytes and/or γδ T cells are expanded in culture for a period of several hours (e.g. about 2, 3, 4, 5, 6, 7, 8, 9, 10, 15, 18, or 21 hours) to about 35 days (e.g. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, or 35 days). In one embodiment, the lymphocytes and/or γδ T cells are expanded for a period of 14 to 21 days. Thus, including an isolation culture period (e.g. of 1 to 40 days, such as 14 to 21 days), the isolation and expansion steps, in some embodiments, can last between 28 and 56 days, or about 41 days.

In further embodiments, expansion comprises culturing the γδ T cells for at least 5 days, at least 6 days, at least 7 days, at least 8 days, at least 9 days, at least 10 days, at least 11 days, at least 12 days, at least 13 days, at least 14 days, at least 21 days, at least 28 days, or longer, e.g. from 5 days to 40 days, from 7 days to 35 days, from 14 days 28 days, or about 21 days. In one embodiment, the expansion step comprises culturing the γδ T cells for at least 10, 15 or 20 days to produce an expanded population. In one embodiment, the expansion step comprises culturing the γδ T cells between 5 and 25 days, such as between 14 and 21 days. In a further embodiment, the expansion step comprises culturing the γδ T cells for about 20 days.

In some embodiments, the typical amount of IL-2 effective to produce an expanded population of γδ T cells is from 1 IU/mL to 2,000 IU/mL (e.g. from 5 IU/mL to 1,000 IU/mL, from 10 IU/mL to 500 IU/mL, from 20 IU/mL to 400 IU/mL, from 50 IU/mL to 250 IU/mL, or about 100 IU/mL, e.g. from 5 IU/mL to 10 IU/mL, from 10 IU/mL to 20 IU/mL, from 20 IU/mL to 30 IU/mL, from 30 IU/mL to 40 IU/mL, from 40 IU/mL to 50 IU/mL, from 50 IU/mL to 60 IU/mL, from 60 IU/mL to 70 IU/mL, from 70 IU/mL to 80 IU/mL, from 80 IU/mL to 90 IU/mL, from 90 IU/mL to 100 IU/mL, from 100 IU/mL to 120 IU/mL, from 120 IU/mL to 140 IU/mL, from 140 IU/mL to 150 IU/mL, from 150 IU/mL to 175 IU/mL, from 175 IU/mL to 200 IU/mL, from 200 IU/mL to 300 IU/mL, from 300 IU/mL to 400 IU/mL, from 400 IU/mL to 500 IU/mL, from 500 IU/mL to 1,000 IU/mL, from 1,000 IU/mL to 1,500 IU/mL, from 1,500 IU/mL to 2,000 IU/mL, or greater). In some embodiments, the amount of IL-2 effective to produce an expanded population of γδ T cells is about 100 IU/mL.

In some embodiments, the typical amount of IL-15 effective to produce an expanded population of γδ T cells (e.g. skin-derived γδ T cells and/or non-Vδ2 T cells, such as Vδ1 T cells and/or DN T cells) is at least 0.1 ng/mL (e.g. from 0.1 ng/mL to 10,000 ng/mL, from 1.0 ng/mL to 1,000 ng/mL, from 5 ng/mL to 800 ng/mL, from 10 ng/mL to 750 ng/mL, from 20 ng/mL to 500 ng/mL, from 50 ng/mL to 400 ng/mL, or from 100 ng/mL to 250 ng/mL, e.g., from 0.1 ng/mL to 1.0 ng/mL, from 1.0 ng/mL to 5.0 ng/mL, from 5.0 ng/mL to 10 ng/mL, from 10 ng/mL to 20 ng/mL, from 20 ng/mL to 50 ng/mL, from 50 ng/mL to 100 ng/mL, from 100 ng/mL to 200 ng/mL, from 200 ng/mL to 500 ng/mL, or from 500 ng/mL to 1,000 ng/mL). In some embodiments, the amount of IL-15 effective to produce an expanded population of γδ T cells is about 10 ng/mL.

Substitution or addition of other factors in the expansion culture of non-haematopoietic tissue-resident γδ T cells may also be used. Such additional or alternative factors for the expansion of lymphocytes such as αβ T cells or NK cells are known in the art. In one embodiment, such factors are used in the expansion which selectively promote the expansion of γδ T cells. In a further embodiment such factors are used in the expansion which selectively promote the expansion of lymphocytes such as αβ T cells and/or NK cells.

It will be understood that the amount of each of the above cytokines required to produce an expanded population of γδ T cells will depend of the concentrations of one or more of the other cytokines. For example, if the concentration of IL-2 is increased or decreased, the concentration of IL-15 may be accordingly decreased or increased, respectively. As noted above, the amount effective to produce an expanded population refers herein to composite effect of all factors on cell expansion.

Methods of expansion provide an expanded population of γδ T cells that is greater in number than a reference population. In some embodiments, the expanded population of γδ T cells is greater in number than the isolated population of γδ T cells prior to the expansion step (e.g. at least 2-fold in number, at least 3-fold in number, at least 4-fold in number, at least 5-fold in number, at least 6-fold in number, at least 7-fold in number, at least 8-fold in number, at least 9-fold in number, at least 10-fold in number, at least 15-fold in number, at least 20-fold in number, at least 25-fold in number, at least 30-fold in number, at least 35-fold in number, at least 40-fold in number, at least 50-fold in number, at least 60-fold in number, at least 70-fold in number, at least 80-fold in number, at least 90-fold in number, at least 100-fold in number, at least 200-fold in number, at least 300-fold in number, at least 400-fold in number, at least 500-fold in number, at least 600-fold in number, at least 700-fold in number, at least 800-fold in number, at least 900-fold in number, at least 1,000-fold in number at least 5,000-fold in number, at least 10,000-fold in number, or more relative to the isolated population of γδ T cells prior to the expansion step).

In one embodiment, the expansion step comprises culturing the isolated γδ T cells in the absence of substantial stromal cell contact. In a further embodiment, the expansion step comprises culturing the isolated γδ T cells in the absence of substantial fibroblast cell contact.

It will be appreciated that methods of expansion defined herein also apply to the expansion of other lymphocytes (e.g. αβ T cells and/or NK cells). In such embodiments, the expansion step comprises culturing the isolated lymphocytes in the presence of the relevant growth factors and/or nutrients (e.g. cytokines and/or chemokines) to produce an expanded population of lymphocytes (e.g. as T cells and/or NK cells).

In one embodiment, the methods of expanding a population of γδ T cells as defined herein comprise culturing the γδ T cells or other lymphocytes in serum-free medium. In a further embodiment, the methods of expanding a population of γδ T cells as defined herein comprise culturing the γδ T cells in medium containing serum-replacement. It will be therefore appreciated that such expansion of γδ T cells in a serum-free or serum-replacement containing medium will achieve similar advantages to those described above.

In some embodiments, no substantial TCR pathway activation is present during the expansion step (e.g. no exogenous TCR pathway activators are included in the culture). In one embodiment, the expansion step comprises the absence of exogenous TCR pathway agonists. Further, provided herein are methods of expanding γδ T cells isolated according to the methods defined herein, wherein said expansion methods do not involve contact with feeder cells, tumour cells, and/or antigen-presenting cells. Thus, in a further embodiment of the methods defined herein, the expansion of γδ T cells comprises culturing the γδ T cells in the absence of substantial stromal cell contact.

Also provided is a means to produce large populations of non-haematopoietic tissue-derived γδ T cells (e.g. skin-derived γδ T cells and/or non-Vδ2 T cells, such as Vδ1 T cells and/or DN T cells) at high rates (e.g. by removing stromal cell contact and/or TCR stimulation, or by culturing in the presence of an effective amount of factors). In some embodiments, the expansion step described herein expands the γδ T cells at a low population doubling time, which is given by the following equation:

$$DoublingTime = \frac{duration * \log(2)}{\log(FinalConcentration) - \log(InitialConcentration)}$$

Given the information provided herein, a skilled artisan will recognize that the invention provides methods of expanding non-haematopoietic tissue-derived γδ T cells (e.g. skin-derived γδ T cells and/or non-Vδ2 T cells, such as Vδ1 T cells and/or DN T cells) at a population doubling time of less than 5 days (e.g. less than 4.5 days, less than 4.0 days, less than 3.9 days, less than 3.8 days, less than 3.7 days, less than 3.6 days, less than 3.5 days, less than 3.4 days, less than 3.3 days, less than 3.2 days, less than 3.1 days, less than 3.0 days, less than 2.9 days, less than 2.8 days, less than 2.7 days, less than 2.6 days, less than 2.5 days, less than 2.4 days, less than 2.3 days, less than 2.2 days, less than 2.1 days, less than 2.0 days, less than 46 hours, less than 42 hours, less than 38 hours, less than 35 hours, less than 32 hours).

In some embodiments, within 7 days of culture, the expanded population of γδ T cells (e.g. the expanded population of Vδ1 T cells and/or DN T cells) comprises at least 10-fold the number of γδ T cells relative to the isolated population of γδ T cells prior to expansion (e.g. at least 20-fold, at least 30-fold, at least 40-fold, at least 50-fold, at least 60-fold, at least 70-fold, at least 80-fold, at least 90-fold, at least 100-fold, at least 150-fold, at least 200-fold, at least 300-fold, at least 400-fold, at least 500-fold, at least 600-fold, at least 700-fold, at least 800-fold, at least 900-fold, at least 1,000-fold, at least 2,000-fold, at least 3,000-fold, at least 4,000-fold, at least 5,000-fold, at least 6,000-fold, at least 7,000-fold, or at least 8,000-fold the number of γδ T cells relative to the isolated population of γδ T cells prior to expansion). In some embodiments, within 14 days of culture, the expanded population of γδ T cells (e.g. the expanded population of Vδ1 T cells and/or DN T cells) comprises at least 20-fold the number of γδ T cells relative to the isolated population of γδ T cells prior to expansion (e.g. at least 30-fold, at least 40-fold, at least 50-fold, at least 60-fold, at least 70-fold, at least 80-fold, at least 90-fold, at least 100-fold, at least 150-fold, at least 200-fold, at least 300-fold, at least 400-fold, at least 500-fold, at least 600-fold, at least 700-fold, at least 800-fold, at least 900-fold, at least 1,000-fold, at least 2,000-fold, at least 3,000-fold, at least 4,000-fold, at least 5,000-fold, at least 6,000-fold, at least 7,000-fold, at least 8,000-fold, at least 9,000-fold, or at least 10,000-fold the number of γδ T cells relative to the isolated population of γδ T cells prior to expansion). In some embodiments, within 21 days of culture, the expanded population of γδ T cells (e.g. the expanded population of Vδ1 T cells and/or DN T cells) comprises at least 50-fold the number of γδ T cells relative to the isolated population of γδ T cells prior to expansion (e.g. at least 60-fold, at least 70-fold, at least 80-fold, at least 90-fold, at least 100-fold, at least 150-fold, at least 200-fold, at least 300-fold, at least 400-fold, at least 500-fold, at least 600-fold, at least 700-fold, at least 800-fold, at least 900-fold, at least 1,000-fold, at least 2,000-fold, at least 3,000-fold, at least 4,000-fold, at least 5,000-fold, at least 6,000-fold, at least 7,000-fold, at least 8,000-fold, at least 9,000-fold, or least 10,000-fold the number of γδ T cells relative to the isolated population of γδ T cells prior to expansion). In some embodiments, within 28 days of culture, the expanded population of γδ T cells (e.g. the expanded population of Vδ1 T cells and/or DN T cells) comprises at least 100-fold the number of γδ T cells relative to the isolated population of γδ T cells prior to expansion (e.g. at least 110-fold, at least 120-fold, at least 130-fold, at least 140-fold, at least 150-fold, at least 200-fold, at least 300-fold, at least 400-fold, at least 500-fold, at least 600-fold, at least 700-fold, at least 800-fold, at least 900-fold, at least 1,000-fold, at least 2,000-fold, at least 3,000-fold, at least 4,000-fold, at least 5,000-fold, at least 6,000-fold, at least 7,000-fold, at least 8,000-fold, at least 9,000-fold, at least 10,000-fold, at least 12,000-fold, or at least 15,000-fold the number of γδ T cells relative to the isolated population of γδ T cells prior to expansion).

Non-haematopoietic tissue-derived γδ T cells (e.g. skin-derived γδ T cells and/or non-Vδ2 T cells, such as Vδ1 T cells and/or DN T cells) expanded by the methods provided herein can have a phenotype well-suited for anti-tumor efficacy. In some embodiments, the expanded population of γδ T cells (e.g. skin-derived Vδ1 T cells) has a greater mean expression of CD27 than a reference population (e.g. the isolated population of γδ T cells prior to the expansion step). In some embodiments, the expanded population of γδ T cells has a mean expression of CD27 that is at least 2-fold relative to the isolated population of γδ T cells (e.g. at least 3-fold, at least 4-fold, at least 5-fold, at least 6-fold, at least 7-fold, at least 8-fold, at least 9-fold, at least 10-fold, at least 15-fold, at least 20-fold, at least 25-fold, at least 30-fold, at least 40-fold, at least 50-fold, at least 60-fold, at least 70-fold, at least 80-fold, at least 90-fold, at least 100-fold, at least 150-fold, at least 200-fold, at least 300-fold, at least 400-fold, at least 500-fold, at least 600-fold, at least 700-fold, at least 800-fold, at least 900-fold, at least 1,000-fold, at least 5,000-fold, at least 10,000-fold, at least 20,000-fold, or more, relative to the isolated population of γδ T cells).

A distinct portion of the expanded population of γδ T cells (e.g. skin-derived γδ T cells and/or non-Vδ2 T cells, such as Vδ1 T cells and/or DN T cells) may upregulate CD27, while another portion is CD27$1^{low}$ or CD27$^{negative}$. In this case, the frequency of CD27$^{positive}$ cells in the expanded population relative to the isolated population of γδ T cells may be greater. For example, the expanded population of γδ T cells may have at least a 5% greater frequency of CD27$^{positive}$ cells relative to that of the isolated population of γδ T cells prior to expansion (e.g. at least a 10%, at least a 15%, at least a 20%, at least a 25%, at least a 30%, at least a 35%, at least a 40%, at least a 45%, at least a 50%, at least a 60%, at least a 70%, at least an 80%, at least a 90%, or up to 100% greater frequency of CD27$^{positive}$ cells relative to that of the isolated population of γδ T cells prior to expansion). In some embodiments, the number of CD27$^{positive}$ cells in the expanded population relative to the isolated population of γδ T cells may be increased. For example, the expanded population of γδ T cells may have at least 2-fold the number of CD27$^{positive}$ cells relative to the isolated population of γδ T cells prior to expansion. The expanded population of γδ T cells may have a frequency of CD27+ cells of greater than 10%, greater than 20%, greater than 30%, greater than 40%, greater than 50%, greater than 60%, greater than 70%, greater than 80% or greater than 90%. Alternatively, the expanded population of γδ T cells may have a frequency of CD27+ cells of about 10%, about 20%, about 30%, about 40%, about 50%, about 60%, about 70%, about 80% or about 90%. In certain embodiments, the expanded population of γδ T cells has a frequency of CD27+ cells of greater than 50%.

Methods of expansion as provided herein, in some embodiments, yield an expanded population non-haematopoietic tissue-derived γδ T cells (e.g. skin-derived γδ T cells and/or non-Vδ2 T cells, such as Vδ1 T cells and/or DN T cells) having a low expression of TIGIT, relative to a reference population (e.g. the isolated population of γδ T cells prior to the expansion step). In some embodiments, the expanded population of γδ T cells has a lower mean expression of TIGIT than a reference population (e.g. the isolated population of γδ T cells prior to the expansion step). In some embodiments, the expanded population of γδ T cells has a mean expression of TIGIT that is at least 10% less than the isolated population of γδ T cells (e.g. at least 20% less, at least 30% less, at least 40% less, at least 50% less, at least 60% less, at least 70% less, at least 80% less, at least 90% less, or up to 100% less than the isolated population of γδ T cells). The expanded population of γδ T cells may have a frequency of TIGIT+ cells of less than 90%, less than 80%, less than 70%, less than 60%, less than 50%, less than 40%, less than 30%, less than 20% or less than 10%. Alternatively, the expanded population of γδ T cells may have a frequency of TIGIT+ cells of about 90%, about 80%, about 70%, about 60%, about 50%, about 40%, about 30%, about 20% or about 10%. In certain embodiments, the isolated population of γδ T cells has a frequency of TIGIT+ cells of less than 80%.

In some embodiments, the expanded population of γδ T cells (e.g. skin-derived γδ T cells or non-Vδ2 T cells, such as Vδ1 T cells and/or DN T cells) has a high number or frequency of CD27+ cells and a low frequency of TIGIT$^+$ cells. In some embodiments, the expanded population of γδ T cells has a high frequency of CD27$^+$TIGIT$^-$ cells relative to a reference population (e.g. relative to an isolated population of γδ T cells prior to expansion). For instance, the expanded population of γδ T cells may have at least a 5% greater frequency of CD27$^+$ TIGIT$^-$ cells relative to that of the isolated population of γδ T cells prior to expansion (e.g. at least a 10%, at least a 15%, at least a 20%, at least a 25%, at least a 30%, at least a 35%, at least a 40%, at least a 45%, at least a 50%, at least a 60%, at least a 70%, at least an 80%, at least a 90%, or up to 100% greater frequency of CD27$^+$ TIGIT$^-$ cells relative to that of the isolated population of γδ T cells prior to expansion). In some embodiments, the number of CD27$^+$ TIGIT$^-$ cells in the expanded population relative to the isolated population of γδ T cells may be increased. For example, the expanded population of γδ T cells may have at least 2-fold the number of CD27$^+$ TIGIT$^-$ cells relative to the isolated population of γδ T cells prior to expansion (e.g. at least a 10%, at least a 15%, at least a 20%, at least a 25%, at least a 30%, at least a 35%, at least a 40%, at least a 45%, at least a 50%, at least a 60%, at least a 70%, at least an 80%, at least a 90%, or up to 100% greater frequency of CD27$^+$TIGIT$^-$ cells relative to that of the isolated population of γδ T cells prior to expansion).

In some instances, the mean expression of TIGIT on a population of CD27$^+$ γδ T cells in an expanded population of γδ T cells (e.g. skin-derived γδ T cells and/or non-Vδ2 T cells, such as Vδ1 T cells and/or DN T cells) is low relative to a reference population. In some embodiments, the expanded population of CD27$^+$ γδ T cells has a lower mean expression of TIGIT than a reference population (e.g. the isolated population of CD27$^+$ γδ T cells prior to the expansion step). In some embodiments, the expanded population of CD27$^+$ γδ T cells has a mean expression of TIGIT that is at least 10% less than the isolated population of CD27$^+$ γδ T cells (e.g. at least 20% less, at least 30% less, at least 40% less, at least 50% less, at least 60% less, at least 70% less, at least 80% less, at least 90% less, or up to 100% less than the isolated population of CD27$^+$γδ T cells).

Additionally or alternatively, the median expression of CD27 on a population of TIGIT$^-$ γδ T cells in an expanded population of γδ T cells (e.g. skin-derived γδ T cells and/or non-Vδ2 T cells, such as Vδ1 T cells and/or DN T cells) is high relative to a reference population. For example, the expanded population of TIGIT$^-$ γδ T cells may have at least a 5% greater frequency of CD27$^+$ cells relative to that of the isolated population of TIGIT$^-$ γδ T cells prior to expansion (e.g. at least a 10%, at least a 15%, at least a 20%, at least a 25%, at least a 30%, at least a 35%, at least a 40%, at least a 45%, at least a 50%, at least a 60%, at least a 70%, at least an 80%, at least a 90%, or up to 100% greater frequency of CD27$^+$ cells relative to that of the isolated population of TIGIT$^-$ γδ T cells prior to expansion). In some embodiments, the number of CD27$^+$ cells in the expanded population relative to the isolated population of TIGIT$^-$ γδ T cells may be increased. For example, the expanded population of TIGIT$^-$ γδ T cells may have at least 2-fold the number of CD27$^+$ cells relative to the isolated population of TIGIT$^-$ γδ T cells prior to expansion (e.g. at least a 10%, at least a 15%, at least a 20%, at least a 25%, at least a 30%, at least a 35%, at least a 40%, at least a 45%, at least a 50%, at least a 60%, at least a 70%, at least an 80%, at least a 90%, or up to 100% greater frequency of CD27$^+$ cells relative to that of the isolated population of TIGIT$^-$ γδ T cells prior to expansion).

An increase or decrease in expression of other markers can be additionally or alternatively used to characterize one or more expanded populations of non-haematopoietic tissue-derived γδ T cells (e.g. skin-derived γδ T cells and/or non-Vδ2 T cells, such as Vδ1 T cells and/or DN T cells), including CD124, CD215, CD360, CTLA4, CD1b, BTLA, CD39, CD45RA, Fas Ligand, CD25, ICAM-1, CD31, KLRG1, CD30, CD2, NKp44, NKp46, ICAM-2, CD70, CD28, CD103, NKp30, LAG3, CCR4, CD69, PD-1, and CD64. In some instances, the expanded population of γδ T cells (e.g. skin-derived γδ T cells and/or non-Vδ2 T cells, such as Vδ1 T cells and/or DN T cells) has a greater mean expression of one or more of the markers selected from the group consisting of CD124, CD215, CD360, CTLA4, CD1b, BTLA, CD39, CD45RA, Fas Ligand, CD25, ICAM-1, CD31, KLRG1, CD30, and CD2, relative to the isolated population of γδ T cells, e.g. prior to expansion. Additionally or alternatively, the expanded population of γδ T cells may have a greater frequency of cells expressing one or more of the markers selected from the group consisting of CD124, CD215, CD360, CTLA4, CD1b, BTLA, CD39, CD45RA, Fas Ligand, CD25, ICAM-1, CD31, KLRG1, CD30, and CD2, relative to the isolated population of γδ T cells. In some embodiments, the expanded population of γδ T cells has a lower mean expression of one or more of the markers selected from the group consisting of NKp44, NKp46, ICAM-2, CD70, CD28, CD103, NKp30, LAG3, CCR4, CD69, PD-1, and CD64, relative to the isolated population of γδ T cells. The expanded population may similarly have a lower frequency of cells expressing one or more of the markers selected from the group consisting of NKp44, NKp46, ICAM-2, CD70, CD28, CD103, NKp30, LAG3, CCR4, CD69, PD-1, and CD64, relative to the isolated population of γδ T cells.

A non-haematopoietic tissue-resident γδ T cell produced by the method of the invention may thus have one or more of the following properties: (i) displays the phenotype $CD69^{high}$, $TIM3^{high}$ and $CD28^{low/absent}$; (ii) upregulates of one or more of CCR3, CD39, CD11b, and CD9; (iii) produces IFN-γ in response to an NKG2D ligand in the absence of TCR agonists; (iv) produces IL-13 in the absence of TCR agonists; (v) produces one or more of IFN-γ, TNF-α and GM-CSF in response to TCR activation; (vi) produces no or substantially no IL-17 in response to TCR activation; (vii) grows in culture medium containing IL-2 without additional growth factors; (viii) displays a cytotoxic T cell response in the absence of TCR agonists; and/or (ix) displays selective cytotoxicity for tumor cells over normal cells.

In some instances, a non-haematopoietic tissue-resident γδ T cell produced by the methods of the invention produces IL-13 in the absence of TCR agonists and/or produces IFN-γ in response to an NKG2D ligand in the absence of TCR agonists.

Numerous basal culture media suitable for use in the proliferation of γδ T cells are available, in particular medium, such as AIM-V, Iscoves medium and RPMI-1640 (Life Technologies). The medium may be supplemented with other media factors as defined herein, such as serum, serum proteins and selective agents, such as antibiotics. For example, in some embodiments, RPMI-1640 medium containing 2 mM glutamine, 10% FBS, 10 mM HEPES, pH 7.2, 1% penicillin-streptomycin, sodium pyruvate (1 mM; Life Technologies), non-essential amino acids (e.g. 100 μM Gly, Ala, Asn, Asp, Glu, Pro and Ser; 1×MEM non-essential amino acids (Life Technologies)), and 10 μl/L β-mercaptoethanol. In an alternative embodiment, AIM-V medium may be supplemented with CTS Immune serum replacement and amphotericin B. In certain embodiments as defined herein, the media may be further supplemented with IL-2 and IL-15.

Conveniently, cells are cultured at 37° C. in a humidified atmosphere containing 5% $CO_2$ in a suitable culture medium during isolation and/or expansion.

According to a further aspect of the invention there is provided a method for the isolation and expansion of lymphocytes from a non-haematopoietic tissue sample comprising the steps of:
(i) isolating a population of lymphocytes from the non-haematopoietic tissue sample according to the method defined herein; and
(ii) further culturing said population of lymphocytes (such as for at least 5 days) to produce an expanded population of lymphocytes.

In one embodiment, the lymphocytes comprise αβ T cells. Therefore, according to a further aspect of the invention there is provided a method for the isolation and expansion of αβ T cells from a non-haematopoietic tissue sample comprising the steps of:
(i) isolating a population of αβ T cells from the non-haematopoietic tissue sample according to the method defined herein; and
(ii) further culturing said population of αβ T cells (such as for at least 5 days) to produce an expanded population of αβ T cells.

Culturing in step (ii) may be by selective expansion, such as by choosing culturing conditions where αβ T cells are preferentially expanded over other cells types present in the isolated population in step (i). Alternatively, the expansion conditions are not selective and culturing in step (ii) may be followed by depletion of non-target cells (e.g. cells other than αβ T cells). Alternatively, the expansion conditions are not selective and depletion of non-target cells (e.g. cells other than as T cells) occurs prior to culturing in step (ii). It is noted that the objective of these embodiments is to expand the total number of αβ T cells while also increasing their proportion in the population.

In one embodiment, the lymphocytes comprise NK cells. Therefore, according to a further aspect of the invention there is provided a method for the isolation and expansion of NK cells from a non-haematopoietic tissue sample comprising the steps of:
(i) isolating a population of NK cells from the non-haematopoietic tissue sample according to the method defined herein; and
(ii) further culturing said population of NK cells (such as for at least 5 days) to produce an expanded population of NK cells.

Culturing in step (ii) may be by selective expansion, such as by choosing culturing conditions where NK cells are preferentially expanded over other cells types present in the isolated population in step (i). Alternatively, the expansion conditions are not selective and culturing in step (ii) may be followed by depletion of non-target cells (e.g. cells other than NK cells). Alternatively, the expansion conditions are not selective and depletion of non-target cells (e.g. cells other than NK cells) occurs prior to culturing in step (ii). It is noted that the objective of these embodiments is to expand the total number of NK cells while also increasing their proportion in the population.

In one embodiment, the lymphocytes comprise γδ T cells. Therefore, according to a further aspect of the invention there is provided a method for the isolation and expansion of γδ T cells from a non-haematopoietic tissue sample comprising the steps of:
(i) isolating a population of γδ T cells from the non-haematopoietic tissue sample according to the method defined herein; and (ii) further culturing said population of γδ T cells (such as for at least 5 days) to produce an expanded population of γδ T cells.

Culturing in step (ii) may be by selective expansion, such as by choosing culturing conditions where γδ T cells are preferentially expanded over other cells types present in the isolated population in step (i). Alternatively, the expansion conditions are not selective and culturing in step (ii) may be followed by depletion of non-target cells (e.g. cells other than γδ T cells). Alternatively, the expansion conditions are not selective and depletion of non-target cells (e.g. cells other than γδ T cells) occurs prior to culturing in step (ii). It is noted that the objective of these embodiments is to expand the total number of γδ T cells while also increasing their proportion in the population.

According to one aspect of the invention, there is provided an expanded population of isolated lymphocytes (e.g. skin-derived αβ T cells and/or NK cells) obtained by any of the methods defined herein.

According to a further aspect of the invention, there is provided an expanded population of isolated lymphocytes cells obtainable by any of the methods defined herein.

According to a yet further aspect of the invention, there is provided an expanded population of isolated γδ T cells obtained by any of the methods defined herein.

According to a yet further aspect of the invention, there is provided an expanded population of isolated γδ T cells obtainable by any of the methods defined herein.

In one embodiment, the isolated population comprises greater than 50% γδ T cells, such as greater that 75% γδ T cells, in particular greater that 85% γδ T cells. In one embodiment, the isolated population comprises Vδ1 cells, wherein less than 50%, such as less than 25% of the Vδ1 cells express TIGIT. In one embodiment, the isolated population comprises Vδ1 cells, wherein more than 50%, such as more than 60% of the Vδ1 cells express CD27.

The lymphocytes and/or γδ T cells obtained by the method of the invention may be used as a medicament, for example for adoptive T cell therapy. This involves the transfer of lymphocytes and/or γδ T cells obtained by the method of the invention into a patient. The therapy may be autologous, i.e. the γδ T cells may be transferred back into the same patient from which they were obtained, or the therapy may be allogeneic, i.e. the γδ T cells from one person may be transferred into a different patient. In instances involving allogeneic transfer, the γδ T cells may be substantially free of αβ T cells. For example, αβ T cells may be depleted from the γδ T cell population, e.g., after expansion, using any suitable means known in the art (e.g., by negative selection, e.g., using magnetic beads). A method of treatment may include; providing a sample of non-haematopoietic tissue obtained from a donor individual; culturing the γδ T cells from the sample as described above to produce an expanded population; and administering the expanded population of γ T cells to a recipient individual.

The patient or subject to be treated is preferably a human cancer patient (e.g., a human cancer patient being treated for a solid tumor) or a virus-infected patient (e.g., a CMV-infected or HIV infected patient). In some instances, the patient has and/or is being treated for a solid tumor. Because they are normally resident in non-haematopoietic tissues, tissue-resident Vδ1 T and DN γδ T cells are also more likely to home to and be retained within tumor masses than their systemic blood-resident counterparts and adoptive transfer of these cells is likely to be more effective at targeting solid tumors and potentially other non-haematopoietic tissue-associated immunopathologies.

As γδ T cells are non-MHC restricted, they do not recognize a host into which they are transferred as foreign, which means that they are less likely to cause graft-versus-host disease. This means that they can be used "off the shelf" and transferred into any recipient, e.g., for allogeneic adoptive T cell therapy.

Non-haematopoietic tissue-resident γδ T cells obtained by methods of the invention express NKG2D and respond to a NKG2D ligand (e.g. MICA), which is strongly associated with malignancy. They also express a cytotoxic profile in the absence of any activation and are therefore likely to be effective at killing tumor cells. For example, the non-haematopoietic tissue-resident γδ T cells obtained as described herein may express one or more, preferably all of IFN-γ, TNF-α, GM-CSF, CCL4, IL-13, Granulysin, Granzyme A and B, and Perforin in the absence of any activation. IL-17A may not be expressed.

The findings reported herein therefore provide compelling evidence for the practicality and suitability for the clinical application of the non-haematopoietic tissue-resident γδ T cells obtained by the method of the invention as an "off-the-shelf" immunotherapeutic reagent. These cells possess innate-like killing, have no MHC restriction and display improved homing to and/or retention within tumors than do other T cells.

In some embodiments, a method of treatment of an individual with a tumor in a non-haematopoietic tissue may include; providing a sample of said non-haematopoietic tissue obtained from a donor individual, culturing the γδ T cells from the sample as described above to produce an expanded population, and; administering the expanded population of γδ T cells to the individual with the tumor.

Pharmaceutical compositions may include expanded non-haematopoietic tissue-resident γδ T cells as described herein in combination with one or more pharmaceutically or physiologically acceptable carrier, diluents, or excipients. Such compositions may include buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Cryopreservation solutions which may be used in the pharmaceutical compositions of the invention include, for example, DMSO. Compositions can be formulated, e.g., for intravenous administration.

In one embodiment, the pharmaceutical composition is substantially free of, e.g., there are no detectable levels of a contaminant, e.g., of endotoxin or mycoplasma.

In some instances, a therapeutically effective amount of expanded γδ T cells obtained by the any of the methods described above can be administered in a therapeutically effective amount to a subject (e.g., for treatment of cancer, e.g. for treatment of a solid tumor). In some cases, the therapeutically effective amount of expanded γδ T cells (e.g., skin-derived γδ T cells and/or non-Vδ2 T cells, e.g., Vδ1 T cells and/or DN T cells) is less than $10 \times 10^{12}$ cells per dose (e.g., less than $9 \times 10^{12}$ cells per dose, less than $8 \times 10^{12}$ cells per dose, less than $7 \times 10^{12}$ cells per dose, less than $6 \times 10^{12}$ cells per dose, less than $5 \times 10^{12}$ cells per dose, less than $4 \times 10^{12}$ cells per dose, less than $3 \times 10^{12}$ cells per dose, less than $2 \times 10^{12}$ cells per dose, less than $1 \times 10^{12}$ cells per dose, less than $9 \times 10^{11}$ cells per dose, less than $8 \times 10^{11}$ cells per dose, less than $7 \times 10^{11}$ cells per dose, less than $6 \times 10^{11}$ cells per dose, less than $5 \times 10^{11}$ cells per dose, less than $4 \times 10^{11}$ cells per dose, less than $3 \times 10^{11}$ cells per dose, less than $2 \times 10^{11}$ cells per dose, less than $1 \times 10^{11}$ cells per dose, less than $9\times10^{10}$ cells per dose, less than $7.5\times10^{10}$ cells per dose, less than $5\times10^{10}$ cells per dose, less than $2.5\times10^{10}$ cells per dose, less than $1\times10^{10}$ cells per dose, less than $7.5\times10^{9}$ cells per dose, less than $5\times10^{9}$ cells per dose, less than $2.5\times10^{9}$ cells per dose, less than $1\times10^{9}$ cells per dose, less than $7.5\times10^{8}$ cells per dose, less than $5\times10^{8}$ cells per dose, less than $2.5\times10^{8}$ cells per dose, less than $1\times10^{8}$ cells per dose, less than $7.5\times10^{7}$ cells per dose, less than $5\times10^{7}$ cells per dose, less than $2.5\times10^{7}$ cells per dose, less than $1\times10^{7}$ cells per dose, less than $7.5\times10^{6}$ cells per dose, less than $5\times10^{6}$ cells per dose, less than $2.5\times10^{6}$ cells per dose, less than $1\times10^{6}$ cells per dose, less than $7.5\times10^{5}$ cells per dose, less than $5\times10^{5}$ cells per dose, less than $2.5\times10^{5}$ cells per dose, or less than $1\times10^{5}$ cells per dose). In some embodiments, the therapeutically effective amount of expanded γδ T cells (e.g., skin-derived γδ T cells and/or non-Vδ2 T cells, e.g., Vδ1 T cells and/or DN T cells) is less than $10\times10^{12}$ cells over the course of treatment (e.g., less than $9\times10^{12}$ cells, less than $8\times10^{12}$ cells, less than $7\times10^{12}$ cells, less than $6\times10^{12}$ cells, less than $5\times10^{12}$ cells, less than $4\times10^{12}$ cells, less than $3\times10^{12}$ cells, less than $2\times10^{12}$ cells, less than $1\times10^{12}$ cells, less than $9\times10^{11}$ cells, less than $8\times10^{11}$ cells, less than $7\times10^{11}$ cells, less than $6\times10^{11}$ cells, less than $5\times10^{11}$ cells, less than $4\times10^{11}$ cells, less than $3\times10^{11}$ cells, less than $2\times10^{11}$ cells, less than $1\times10^{11}$ cells, less than $9\times10^{10}$ cells, less than $7.5\times10^{10}$ cells, less than $5\times10^{10}$ cells, less than $2.5\times10^{10}$ cells, less than $1\times10^{10}$ cells, less than $7.5\times10^{9}$ cells, less than $5\times10^{9}$ cells, less than $2.5\times10^{9}$ cells, less than $1\times10^{9}$ cells, less than $7.5\times10^{8}$ cells, less than $5\times10^{8}$ cells, less than $2.5\times10^{8}$ cells, less than $1\times10^{8}$ cells, less than $7.5\times10^{7}$ cells, less than $5\times10^{7}$ cells, less than $2.5\times10^{7}$ cells, less than $1\times10^{7}$ cells, less than $7.5\times10^{6}$ cells, less than $5\times10^{6}$ cells, less than $2.5\times10^{6}$ cells, less than $1\times10^{6}$ cells, less than $7.5\times10^{5}$ cells, less than $5\times10^{5}$ cells, less than $2.5\times10^{5}$ cells, or less than $1\times10^{5}$ cells over the course of treatment).

In some embodiments, a dose of expanded non-haematopoietic tissue-resident γδ T cells as described herein comprises about $1\times10^{6}$, $1.1\times10^{6}$, $2\times10^{6}$, $3.6\times10^{6}$, $5\times10^{6}$, $1\times10^{7}$, $1.8\times10^{7}$, $2\times10^{7}$, $5\times10^{7}$, $1\times10^{8}$, $2\times10^{8}$, or $5\times10^{8}$ cells/kg. In some embodiments, a dose of expanded non-haematopoietic tissue-resident γδ T cells (e.g., skin-derived γδ T cells and/or non-Vδ2 T cells, e.g., Vδ1 T cells and/or DN T cells) comprises at least about $1\times10^{6}$, $1.1\times10^{6}$, $2\times10^{6}$, $3.6\times10^{6}$, $5\times10^{6}$, $1\times10^{7}$, $1.8\times10^{7}$, $2\times10^{7}$, $5\times10^{7}$, $1\times10^{8}$, $2\times10^{8}$, or $5\times10^{8}$ cells/kg. In some embodiments, a dose of expanded non-haematopoietic tissue-resident γδ T cells (e.g., skin-derived γδ T cells and/or non-Vδ2 T cells, e.g., Vδ1 T cells and/or DN T cells) comprises up to about $1\times10^{6}$, $1.1\times10^{6}$, $2\times10^{6}$, $3.6\times10^{6}$, $5\times10^{6}$, $1\times10^{7}$, $1.8\times10^{7}$, $2\times10^{7}$, $5\times10^{7}$, $1\times10^{8}$, $2\times10^{8}$, or $5\times10^{8}$ cells/kg. In some embodiments, a dose of expanded non-haematopoietic tissue-resident γδ T cells (e.g., skin-derived γδ T cells and/or non-Vδ2 T cells, e.g., Vδ1 T cells and/or DN T cells) comprises about $1.1\times10^{6}$-$1.8\times10^{7}$ cells/kg. In some embodiments, a dose of expanded non-haematopoietic tissue-resident γδ T cells (e.g., skin-derived γδ T cells and/or non-Vδ2 T cells, e.g., Vδ1 T cells and/or DN T cells) comprises about $1\times10^{7}$, $2\times10^{7}$, $5\times10^{7}$, $1\times10^{8}$, $2\times10^{8}$, $5\times10^{8}$, $1\times10^{9}$, $2\times10^{9}$, or $5\times10^{9}$ cells. In some embodiments, a dose of expanded non-haematopoietic tissue-resident γδ T cells (e.g., skin-derived γδ T cells and/or non-Vδ2 T cells, e.g., Vδ1 T cells and/or DN T cells) comprises at least about $1\times10^{7}$, $2\times10^{7}$, $5\times10^{7}$, $1\times10^{8}$, $2\times10^{8}$, $5\times10^{8}$, $1\times10^{9}$, $2\times10^{9}$, or $5\times10^{9}$ cells. In some embodiments, a dose of expanded non-haematopoietic tissue-resident γδ T cells (e.g., skin-derived γδ T cells and/or non-Vδ2 T cells, e.g., Vδ1 T cells and/or DN T cells) comprises up to about $1\times10^{7}$, $2\times10^{7}$, $5\times10^{7}$, $1\times10^{8}$, $2\times10^{8}$, $5\times10^{8}$, $1\times10^{9}$, $2\times10^{9}$, or $5\times10^{9}$ cells.

In one embodiment, the subject is administered $10^{4}$ to $10^{6}$ expanded non-haematopoietic tissue-resident γδ T cells (e.g., skin-derived γδ T cells and/or non-Vδ2 T cells, e.g., Vδ1 T cells and/or DN T cells) per kg body weight of the subject. In one embodiment, the subject receives an initial administration of a population of non-haematopoietic tissue-resident γδ T cells (e.g., an initial administration of $10^{4}$ to $10^{6}$ γδ T cells per kg body weight of the subject, e.g., $10^{4}$ to $10^{5}$ γδ T cells per kg body weight of the subject), and one or more (e.g., 2, 3, 4, or 5) subsequent administrations of expanded non-haematopoietic tissue-resident γδ T cells (e.g., one or more subsequent administration of $10^{4}$ to $10^{6}$ expanded non-haematopoietic tissue-resident γδ T cells per kg body weight of the subject, e.g., $10^{4}$ to $10^{5}$ expanded non-haematopoietic tissue-resident γδ T cells per kg body weight of the subject). In one embodiment, the one or more subsequent administrations are administered less than 15 days, e.g., 14, 13, 12, 11, 10, 9, 8, 7, 6, 5, 4, 3, or 2 days after the previous administration, e.g., less than 4, 3, or 2 days after the previous administration. In one embodiment, the subject receives a total of about $10^{6}$ γδ T cells per kg body weight of the subject over the course of at least three administrations of a population of γδ T cells, e.g., the subject receives an initial dose of $1\times10^{5}$ γδ T cells, a second administration of $3\times10^{5}$ γδ T cells, and a third administration of $6\times10^{5}$ γδ T cells, and, e.g., each administration is administered less than 4, 3, or 2 days after the previous administration.

The non-haematopoietic tissue-resident γδ T cells obtained by the method of the invention may also be gene engineered for enhanced therapeutic properties, such as for CAR-T therapy. This involves the generation of engineered T cell receptors (TCRs) to re-program the T cell with a new specificity, e.g. the specificity of a monoclonal antibody. The engineered TCR may make the T cells specific for malignant cells and therefore useful for cancer immunotherapy. For example, the T cells may recognize cancer cells expressing a tumor antigen, such as a tumor associated antigen that is not expressed by normal somatic cells from the subject tissue. Thus, the CAR-modified T cells may be used for adoptive T cell therapy of, for example, cancer patients.

The use of blood-resident γδ T cells for CAR has been described. However, non-haematopoietic tissue-resident γδ T cells obtained by the method of the invention are likely to be particularly good vehicles for CAR-T approaches, as they can be transduced with chimeric antigen-specific TCRs while retaining their innate-like capabilities of recognizing transformed cells, and are likely to have better tumor penetration and retention capabilities than either blood-resident γδ T cells or conventional, systemic αβ T cells. Furthermore, their lack of MHC dependent antigen presentation reduces the potential for graft-versus-host disease and permits them to target tumors expressing low levels of MHC. Likewise, their non-reliance upon conventional co-stimulation, for example via engagement of CD28 enhances the targeting of tumors expressing low levels of ligands for co-stimulatory receptors.

In some embodiments, one or more additional therapeutic agents can be administered to the subject. The additional therapeutic agent may be selected from the group consisting of an immunotherapeutic agent, a cytotoxic agent, a growth inhibitory agent, a radiation therapy agent, an anti-angiogenic agent, or a combination of two or more agents thereof. The additional therapeutic agent may be administered concurrently with, prior to, or after administration of the expanded γδ T cells. The additional therapeutic agent may be an immunotherapeutic agent, which may act on a target within the subject's body (e.g., the subject's own immune system) and/or on the transferred γδ T cells.

The administration of the compositions may be carried out in any convenient manner. The compositions described herein may be administered to a patient transarterially, subcutaneously, intradermally, intratumorally, intranodally, intramedullary, intramuscularly, by intravenous injection, or intraperitoneally, e.g., by intradermal or subcutaneous injection. The compositions of non-haematopoietic tissue-resident γδ T cells may be injected directly into a tumor, lymph node, or site of infection.

It will be understood that all embodiments described herein may be applied to all aspects of the invention.

As used herein, the term "about" when used herein includes up to and including 10% greater and up to and including 10% lower than the value specified, suitably up to and including 5% greater and up to and including 5% lower than the value specified, especially the value specified. The term "between", includes the values of the specified boundaries.

Certain aspects and embodiments of the invention will now be illustrated by way of example and with reference to the figures described above.

EXAMPLES

Example 1. Analytical Methods

Unless otherwise stated, the following methods were utilized to generate the results of the subsequent examples.
Flow Cytometry Flow cytometry was performed using the following antibody-fluorochrome conjugates: Ki-67-BV421, CD3-BVδ10, Vδ1-PeVio770, TIM-3-PE, CD9-PE, CCR3-BV421, and CD39-BV421. Samples were also stained for viability using eFluor770NIR. Commercial antibodies were purchased from Biolegend or Miltenyi. Viability dye (near IR) was from eBioscience. Ki-67 staining was performed on cells fixed and permeabilized using the Foxp3 staining buffer set (eBioscience). Once each experiment was finished, the cell population was washed in PBS and split in half. Cells were stained with eFluor770 NIR for viability and washed, followed by staining with TrueStain (Biolegend) to avoid unspecific binding of staining antibodies. Half of the sample was stained for the indicated surface markers, and the other half was stained for lineage markers only (CD3, Vδ1) and with the equivalent isotype control for the surface markers used. The matched mouse isotype antibody conjugated to the same fluorochrome was used at the same concentration. Isotype controls bind to no known human antigen and therefor indicate unspecific binding or false positives. Data summaries indicate the percentage of cells that stained positive for the indicated marker compared and thus at a level higher than the isotype. Flow cytometry data analysis was performed on FLOWJO (Version 10.1).
Population Analysis Skin resident lymphocytes were isolated using the methods described herein. Within CD45+ cells, anti-CD3 was used to stain for T cells and anti-CD56 antibody to identify NK cells, CD3− CD56+, respectively. Within CD3+ cells, antibodies against pan γδ T cell receptor were used to identify skin-resident γδ T cells, and anti-CD8α to identify proportions of conventional CD4 and CD8 positive αβ T cells within the CD3+, pan γδ TCR− gate.

Determining Total Cell Number

Total cell numbers were generated using an NC-250 Nucleocounter (Chemometec, Copenhagen Denmark) and manufacturer's instructions.

Example 2. Isolation of Lymphocytes from Human Skin Samples

A three-dimensional skin explant protocol was established and is described herein. Tantalum coated reticulated vitreous carbon scaffolds (also called grids) (Ultramet, California, USA) or equivalent having dimensions of 20 mm×1.5 mm, were autoclaved and then washed and fully submerged in PBS prior to use.

Complete isolation medium was prepared containing 1 L of AIM-V media (Gibco, Life Technologies), 50 mL of CTS Immune Serum Replacement (Life Technologies), human recombinant IL-2 (Miltenyi Biotech, Cat no 130-097-746) and human recombinant IL-15 (Miltenyi Biotech, 130-095-766) at the concentrations described below. For the first 7 days of culture, complete isolation medium containing 10 mL of Amphotericin B (250 μg/mL, Life Technologies) was used ("+AMP"). Target final concentration of cytokines in complete isolation media is as follows:

TABLE 1

Final concentration of cytokines in complete isolation media

| Cytokine | Target Final Concentration 1× MEDIA |
|---|---|
| IL-2 | 20 μg/L (20 ng/ml) (>100 IU/ml) |
| IL-15 | 55 μg/L (55 ng/ml) (>275 IU/ml) |

Samples of adult human skin were obtained, shipped and processed within 48 hours of collection. Excess subcutaneous fat and hair was removed from the samples with a scalpel and forceps. Skin samples were placed epidermal side facing upwards, and a punch biopsy of the appropriate size was used to cut the skin, holding the skin around the biopsy with sterile forceps.

Three biopsies, epidermal side up, were spaced evenly and attached to the surface of one tantalum coated carbon grid. Using sterile forceps, the grid was transferred into a tissue culture vessel with a gas permeable membrane such as the well of a G-REX6 well plate (Wilson Wolf Manufacturing) containing 30 mL of complete isolation medium (+AMP), or into a G-REX100 bioreactor (Wilson Wolf Manufacturing) containing 300 mL of complete isolation medium (+AMP). One grid is placed into each well of the G-REX6 well plate, three grids into the G-REX10 bioreactor or ten grids are placed into the G-REX100 bioreactor. Cultures were incubated at 37° C. in a 5% $CO_2$ incubator.

Unless otherwise noted, media was changed every 7 days by gently aspirating the upper media and replacing with 2× complete isolation medium (without AMP), trying not to disturb the cells at the bottom of the plate or bioreactor.

To isolate the lymphocytes, the grids with skin were removed from the G-REX6 well plate or G-REX10 or G-REX100 bioreactor and discarded for disposal. Cells present at the bottom of the plate or bioreactor were resuspended, transferred into 500 mL centrifuge tubes and then centrifuged (e.g. 300 g for 10 minutes).

When cell counts were required, lymphocytes were counted at this stage according to the protocol described in Example 1. Results from an exemplary study are shown in Table 2:

TABLE 2

Isolated lymphocyte yields per donor.

| | Mean Value (7 donors) |
|---|---|
| Total γδ (per grid) | 14.9 × 10e6 |
| Total αβ (per grid) | 101.2 × 10e6 |
| Total γδ-αβ- (per grid) | 23.8 × 10e6 |
| Total lymphocytes (per grid) | 142.2 × 10e6 |
| % γδ (per grid) | 9 |
| % αβ (per grid) | 73 |
| % γδ-αβ- (per grid) | 16 |
| % CD27 (of Panγδ) | 14 |
| % TIGIT (of Panγδ) | 75 |

Example 3. Optimisation of Punch Biopsy Size

Initial testing showed that 3 mm punch biopsies outperformed standard skin mincing methods (FIG. 1).

Optimal punch biopsy size was investigated further by testing 1 mm, 2 mm, 3 mm, 4 mm and 8 mm punch biopsy sizes and using a 2 mm scalpel minced explant as a control. Skin samples were prepared as described in Example 2. Each size was tested by attaching one biopsy, epidermal side up, to the surface of a carbon grid and placed in a well of a 24-well plate (Corning). Each well contained AIM-V 10% human AB serum+IL-2 and IL-15 at the concentrations noted above, plus standard concentrations of β-mercaptoethanol (2ME) and penicillin/streptomycin (P/S).

Biopsies were incubated at 37° C. in a 5% $CO_2$ incubator for 21 days prior to cell harvest and cell yield analysis, with media refreshed three times per week (half media change).

Total cell yield was determined as described in Example 1. Results are shown in Table 2. The results show that biopsies with a 2-4 mm diameter provide the highest cell yield.

TABLE 3

Total cell yield obtained by biopsy type.

| Explant size | Number per tissue | Average yield per biopsy | Potential cell yield per 2 × 5 cm tissue |
|---|---|---|---|
| 2 mm Scalpel minced explant | 250 | 3.5E+05 | 2.9E+07 |
| 1 mm in diameter punch biopsy | 950 | 8.4E+05 | 7.9E+08 |
| 2 mm in diameter punch biopsy | 240 | 1.2E+06 | 2.9E+08 |
| 3 mm in diameter punch biopsy | 96 | 8.9E+05 | 8.6E+07 |
| 4 mm in diameter punch biopsy | 60 | 4.3E+05 | 2.6E+07 |
| 8 mm in diameter punch biopsy | 12 | 3.0E+04 | 3.5E+05 |

Figure 2:
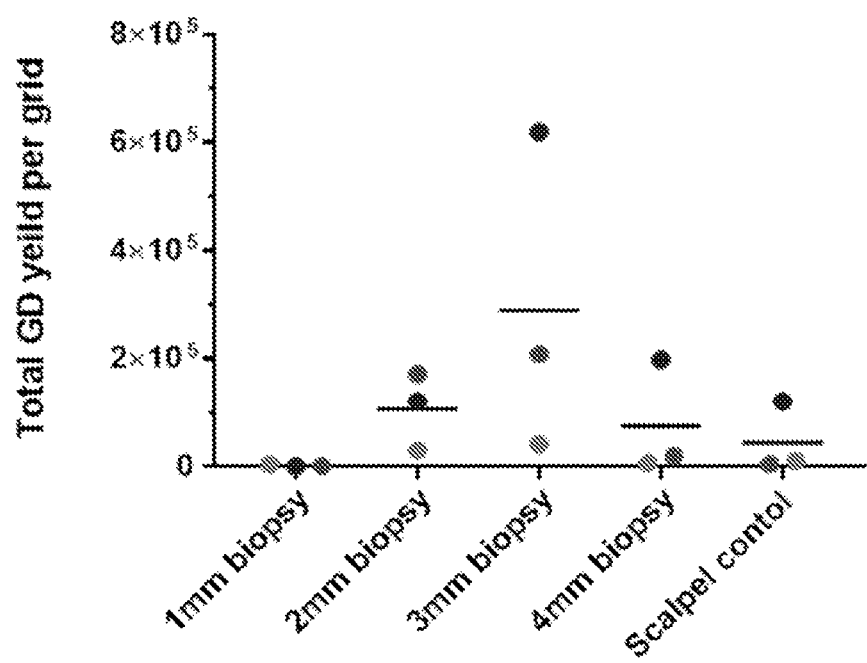
FIG. 2: γδ cell yield from isolated punch biopsies of varying sizes in AIM-V with 5% human AB serum in 24 well plates compared to a minced scalpel sampled control.

The proportion of γδ T cells present in the cell yield was determined as described in Example 1. Results are presented in FIG. 2. The results show that biopsies with a 3 mm diameter provide the highest yield of γδ T cells.

Example 4. Optimisation of Isolation Vessel

Isolation in 24 well plates was compared to using vessels comprising a gas permeable material, such as the G-REX6 well plate (Wilson Wolf Manufacturing). Skin samples were prepared as described in Example 2. Biopsies were attached, epidermal side up, to the surface of a carbon grid which was then placed into a well of a 24 well plate or a G-REX6 well plate. 9 mm grids were used for the 24-well plate and 20 mm grids were used for the G-REX6 well plate. All samples were plated in AIM-V 10% AB serum+P/S+2ME+IL-2+IL-15. For 24-well plates, media was refreshed three times per week. For G-REX6 well plates, only 1 media refresh per week was required. Biopsies were incubated at 37° C. in a 5% $CO_2$ incubator for 21 days prior to cell yield analysis.

Figure 3:
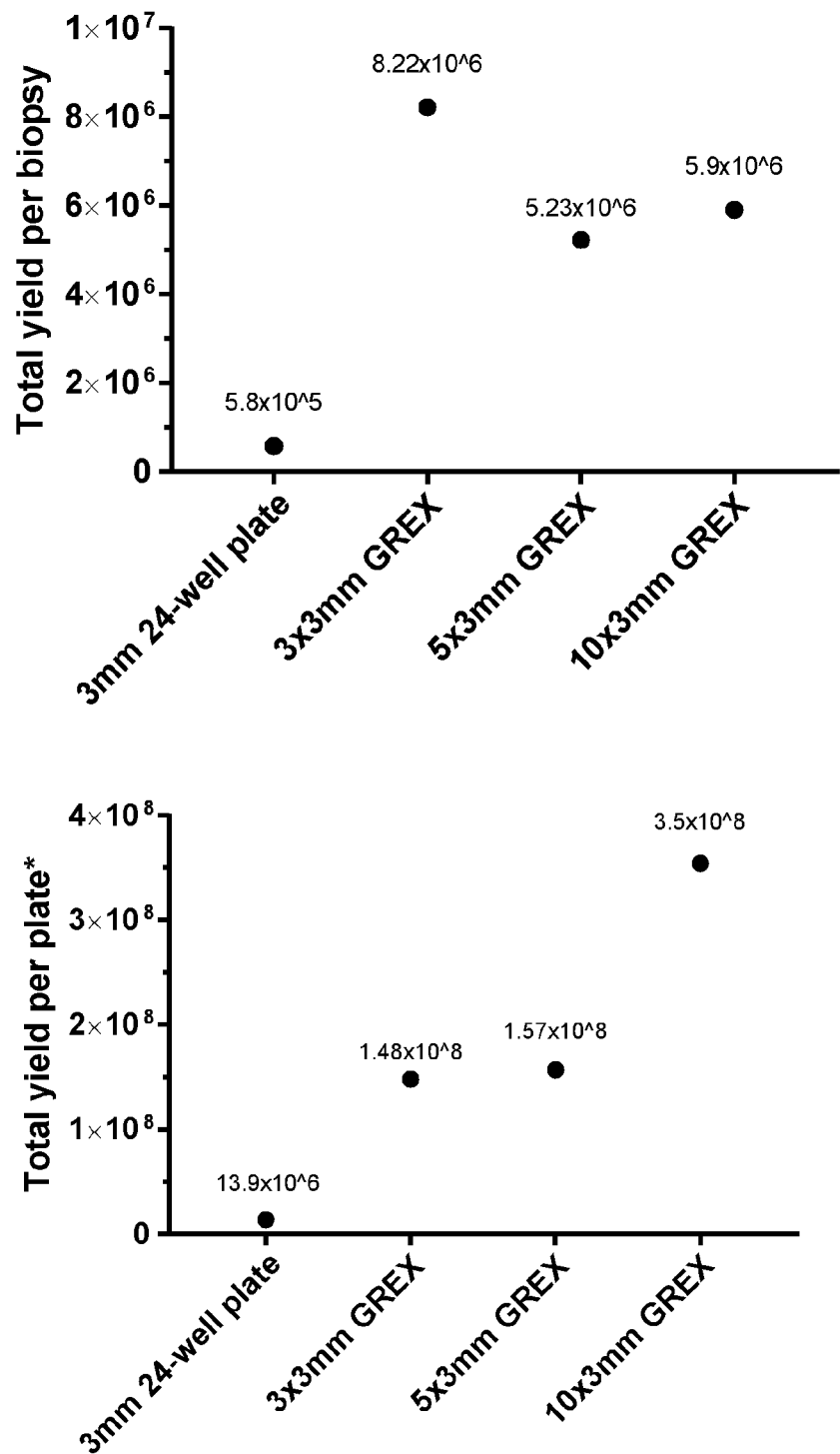
FIG. 3: Total cell yield per biopsy (top graph) and per plate (bottom graph) using different culturing vessels with AIM-V with 5% human AB serum.

Total cell yield per plate and per biopsy was determined as described in Example 1. Experiments showed that the G-REX6 well plate provided increased cell yield per biopsy and per plate when compared to the 24-well plates (FIG. 3 and Table 4). The G-REX6 well plate allowed an increased amount of tissue to be cultured (2.5 times more tissue compared to a 24-well plate), however they yielded a staggering increase of 25 times the number of cells.

TABLE 4

Total cell yield obtained by 24-well plate vs. G-REX6 well plate

| Vessel | Biopsies/ pieces per grid | Biopsies per tissue | Grids per tissue | Average cell yield per grid | Potential cell yield |
|---|---|---|---|---|---|
| 24 well plate | 3-4 | 250 | 62-83 | 350,000 | 8.75.E+07 |
| G-REX6 well plate | 3 | 96 | 33 | 3.E+07 | 9.E+08 |

Example 5. Optimisation of Isolation Protocol

Use of 3 mm punch biopsies cultured in G-REX vessels was further tested to optimise the isolation protocol. Skin samples were prepared, obtained using a 3 mm punch biopsy and placed in a G-REX6 well plate or G-REX10 bioreactor as described in Example 2. Biopsies were cultured in AIM-V (containing 5% serum replacement (SR), 5% human AB serum or a 5% SR/5% AB "Blend")+2ME+P/S+IL2/15.

Figure 4:
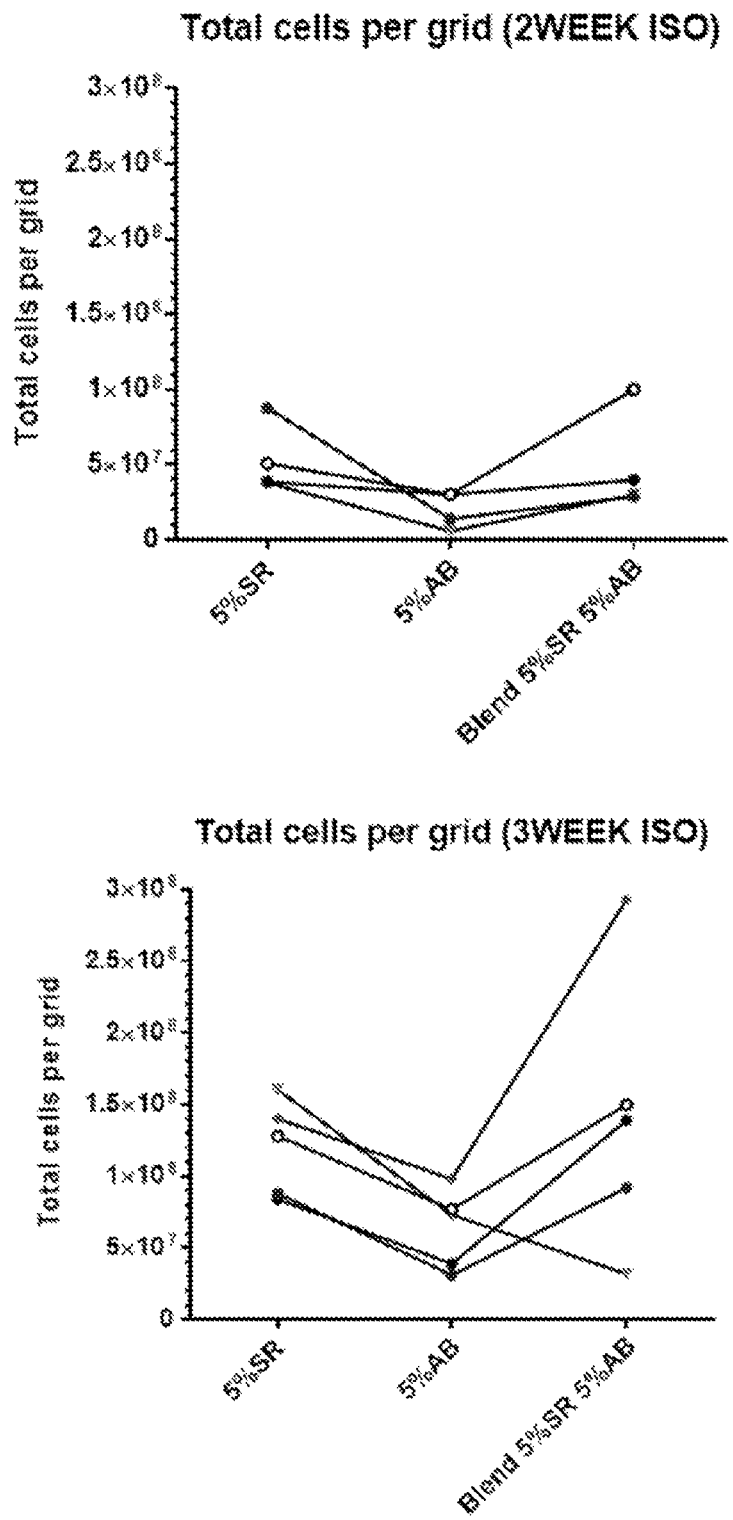
FIG. 4: Comparison of total cell yield following 2 week (top graph) or 3 week (bottom graph) isolation in AIM-V with the indicated serum supplement in G-REX6.

First, duration of cell isolation was tested. Biopsies were incubated at 37° C. in a 5% $CO_2$ incubator for either 14 or 21 days prior to cell yield analysis. Total cell yield per grid was determined as described in Example 1. Results are shown in FIG. 4. Isolation after 3 weeks improved cell yield when compared to isolation after 2 weeks, for all media types.

Figure 5:
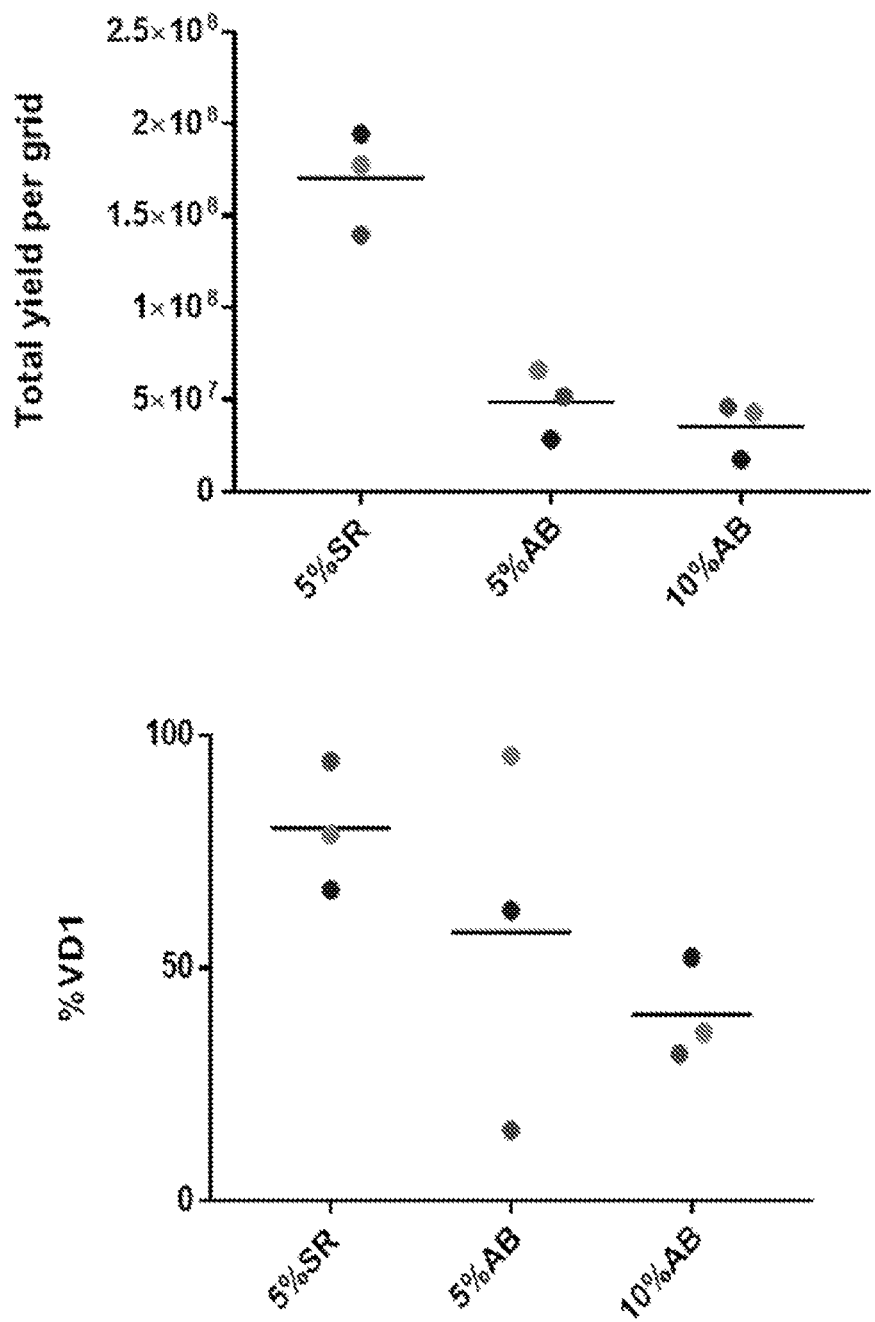
FIG. 5: Total cell yield and proportion of Vδ1 cells isolated using AIM-V media containing 5% serum replacement (SR) versus human AB serum (AB) at 5% or 10% in G-REX6.

Use of serum replacement versus human AB serum (at 5% or 10%) was also tested. Biopsies were incubated at 37° C. in a 5% $CO_2$ incubator for 21 days prior to cell analysis. Total cell yield per grid and % of Vδ1 cells was measured as described in Example 1. Results are shown in FIG. 5. Improved cell yield and a higher proportion of Vδ1 cells was obtained using media supplemented with 5% serum replacement compared to human AB serum.

Example 6. Cell Expansion

Once cells have been isolated using the protocols described above, they can be expanded using methods known in the art. For example, selective expansion of γδ T cells can be achieved using the method of expansion described in WO2017072367.

The invention claimed is:

1. A method for the isolation of lymphocytes from a non-haematopoietic tissue sample comprising the steps of:
   (i) placing the non-haematopoietic tissue sample in a vessel comprising a gas permeable silicone material, wherein the bottom of the vessel is configured to allow gas exchange from the bottom of the vessel;
   (ii) culturing the non-haematopoietic tissue sample in the presence of Interleukin-2 (IL-2) and Interleukin-15 (IL-15); and
   (iii) collecting a population of lymphocytes cultured from the non-haematopoietic tissue sample;
   wherein the non-haematopoietic tissue sample is an intact biopsy obtained by punch biopsy from a non-haematopoietic tissue, and wherein the non-haematopoietic tissue sample has a minimum cross-section of at least 2 mm.

2. The method according to claim 1, wherein the non-haematopoietic tissue sample has a minimum cross-section of about 3 mm.

3. The method according to claim 1, wherein the non-haematopoietic tissue sample is at least 2 mm in diameter.

4. The method according to claim 1, wherein the population of lymphocytes collected from the culture of the non-haematopoietic tissue sample is a population of $\alpha\beta T$ cells or NK cells.

5. The method according to claim 1, wherein:
   (a) the non-haematopoietic tissue sample is not minced prior to culturing and/or
   (b) the non-haematopoietic tissue sample is cultured in serum-free medium or in media containing serum or serum-replacement.

6. The method according to claim 1, wherein the lymphocytes are collected after at least 7 days of culturing.

7. The method according to claim 1, wherein the non-haematopoietic tissue sample is skin, gut, or gastrointestinal tract.

8. The method according to claim 1, wherein the IL-2 is human IL-2 or a functional equivalent thereof.

9. The method according to claim 1, wherein the IL15 is human IL-15 or a functional equivalent thereof.

10. The method according to claim 1, wherein the isolated population of lymphocytes collected from the culture of the non-haematopoietic tissue sample comprises a population of V$\delta$1 T cells.

11. The method according to claim 10, wherein the population of V$\delta$1 T cells express CD27 and/or has a frequency of TIGIT+ cells of about 10% or less.

12. The method according to claim 1, further comprising expanding the isolated population of lymphocytes.

13. The method according to claim 1, wherein the non-haematopoietic tissue sample is placed on a synthetic scaffold inside the vessel.

14. The method according to claim 13, wherein the synthetic scaffold is configured to facilitate lymphocyte egress from the non-haematopoietic tissue sample to the bottom of the vessel.

15. A method for the isolation and expansion of lymphocytes from a non-haematopoietic tissue sample comprising the steps of:
   (i) isolating a population of lymphocytes from the non-haematopoietic tissue sample according to the method according to claim 1; and
   ii) further culturing said population of lymphocytes for at least 5 days to produce an expanded population of lymphocytes.

16. A method for the isolation of $\gamma\delta$ T cells from a non-haematopoietic tissue sample comprising the steps of:
   (i) placing the non-haematopoietic tissue sample in a vessel comprising a gas permeable silicone material, wherein the bottom of the vessel is configured to allow gas exchange from the bottom of the vessel;
   (ii) culturing the non-haematopoietic tissue sample in the presence of IL-2 and IL-15; and
   (iii) collecting a population of $\gamma\delta$ T cells cultured from the non-haematopoietic tissue sample;
   wherein the non-haematopoietic tissue sample is an intact biopsy obtained by punch biopsy from a non-haematopoietic tissue, and wherein the non-haematopoietic tissue sample has a minimum cross-section of at least 2 mm.

* * * * *